(12) United States Patent
Egashira et al.

(10) Patent No.: US 11,936,061 B2
(45) Date of Patent: Mar. 19, 2024

(54) ELECTRIC POWER SOURCE DEVICE AND VEHICLE WITH SAME

(71) Applicant: SANYO Electric Co., Ltd., Osaka (JP)

(72) Inventors: Takuya Egashira, Hyogo (JP); Naotake Yoshida, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 573 days.

(21) Appl. No.: 17/251,237

(22) PCT Filed: May 17, 2019

(86) PCT No.: PCT/JP2019/019679
§ 371 (c)(1),
(2) Date: Dec. 11, 2020

(87) PCT Pub. No.: WO2020/003800
PCT Pub. Date: Jan. 2, 2020

(65) Prior Publication Data
US 2021/0265700 A1 Aug. 26, 2021

(30) Foreign Application Priority Data
Jun. 26, 2018 (JP) .................. 2018-120848

(51) Int. Cl.
| | |
|---|---|
| *H01M 50/358* | (2021.01) |
| *H01M 50/209* | (2021.01) |
| *H01M 50/249* | (2021.01) |
| *H01M 50/262* | (2021.01) |
| *H01M 50/271* | (2021.01) |

(Continued)

(52) U.S. Cl.
CPC ....... *H01M 50/358* (2021.01); *H01M 50/209* (2021.01); *H01M 50/249* (2021.01);
(Continued)

(58) Field of Classification Search
CPC ............. H01M 50/358; H01M 50/209; H01M 50/249; H01M 50/262; H01M 50/271; H01M 50/50; H01M 50/505; B60L 50/64
See application file for complete search history.

(56) References Cited

U.S. PATENT DOCUMENTS

2012/0276423 A1 11/2012 Asakura et al.
2014/0335386 A1 11/2014 Ikeya et al.
(Continued)

FOREIGN PATENT DOCUMENTS

| | | |
|---|---|---|
| CN | 106605315 A | 4/2017 |
| JP | 2013-114952 | 6/2013 |

(Continued)

OTHER PUBLICATIONS

Machine translation of WO-2017/169524-A1. Obtained from PE2E. (Year: 2017).*

(Continued)

*Primary Examiner* — Milton I Cano
*Assistant Examiner* — Oscar Londono
(74) *Attorney, Agent, or Firm* — WHDA, LLP

(57) ABSTRACT

Provided is power supply device configured for safe discharge to the outside of the power supply device even when gas at high temperature and under high pressure is discharged from a secondary battery cell, power supply device including: a plurality of secondary battery cells each having gas discharge valve for discharging internal gas; and cover part disposed on one surface of battery stack with the plurality of secondary battery cells stacked while covering gas discharge valve of each of the plurality of secondary battery cells. Cover part is provided inside with a gas guide path partitioned to discharge gas discharged from gas discharge valve to the outside of cover part, and the gas guide path includes one or more horizontal gas flow bending (Continued)

portions that bend at least a flow direction of some of the gas in plan view of cover part.

21 Claims, 16 Drawing Sheets

(51) Int. Cl.
    *H01M 50/50*     (2021.01)
    *H01M 50/505*     (2021.01)
    *B60L 50/64*     (2019.01)

(52) U.S. Cl.
    CPC ....... *H01M 50/262* (2021.01); *H01M 50/271* (2021.01); *H01M 50/50* (2021.01); *H01M 50/505* (2021.01); *B60L 50/64* (2019.02)

(56) References Cited

U.S. PATENT DOCUMENTS

| | | |
|---|---|---|
| 2015/0125720 A1 | 5/2015 | Fujii et al. |
| 2016/0141573 A1 | 5/2016 | Aoki et al. |
| 2017/0237055 A1 | 8/2017 | Shimizu et al. |

FOREIGN PATENT DOCUMENTS

| | | | | |
|---|---|---|---|---|
| JP | 2014-220149 A | | 11/2014 | |
| JP | 2016/054127 A | * | 4/2016 | ............ Y02E 60/10 |
| WO | 2012/014449 | | 2/2012 | |
| WO | 2014/024433 | | 2/2014 | |
| WO | 2016/136193 | | 9/2016 | |
| WO | WO-2017/169524 A1 | * | 10/2017 | ............ H01M 50/50 |

OTHER PUBLICATIONS

Machine translation of JP-2016/054127-A. Obtained from PE2E. (Year: 2016).*

English Translation of Search Report dated Jun. 30, 2022, issued in counterpart CN Application No. 201980043009.1. (2 pages).

The Extended European Search Report dated Jun. 23, 2021, issued in counterpart EP Application No. 19826884.9. (10 pages).

International Search Report of PCT application No. PCT/JP2019/019679 dated Aug. 6, 2019.

* cited by examiner

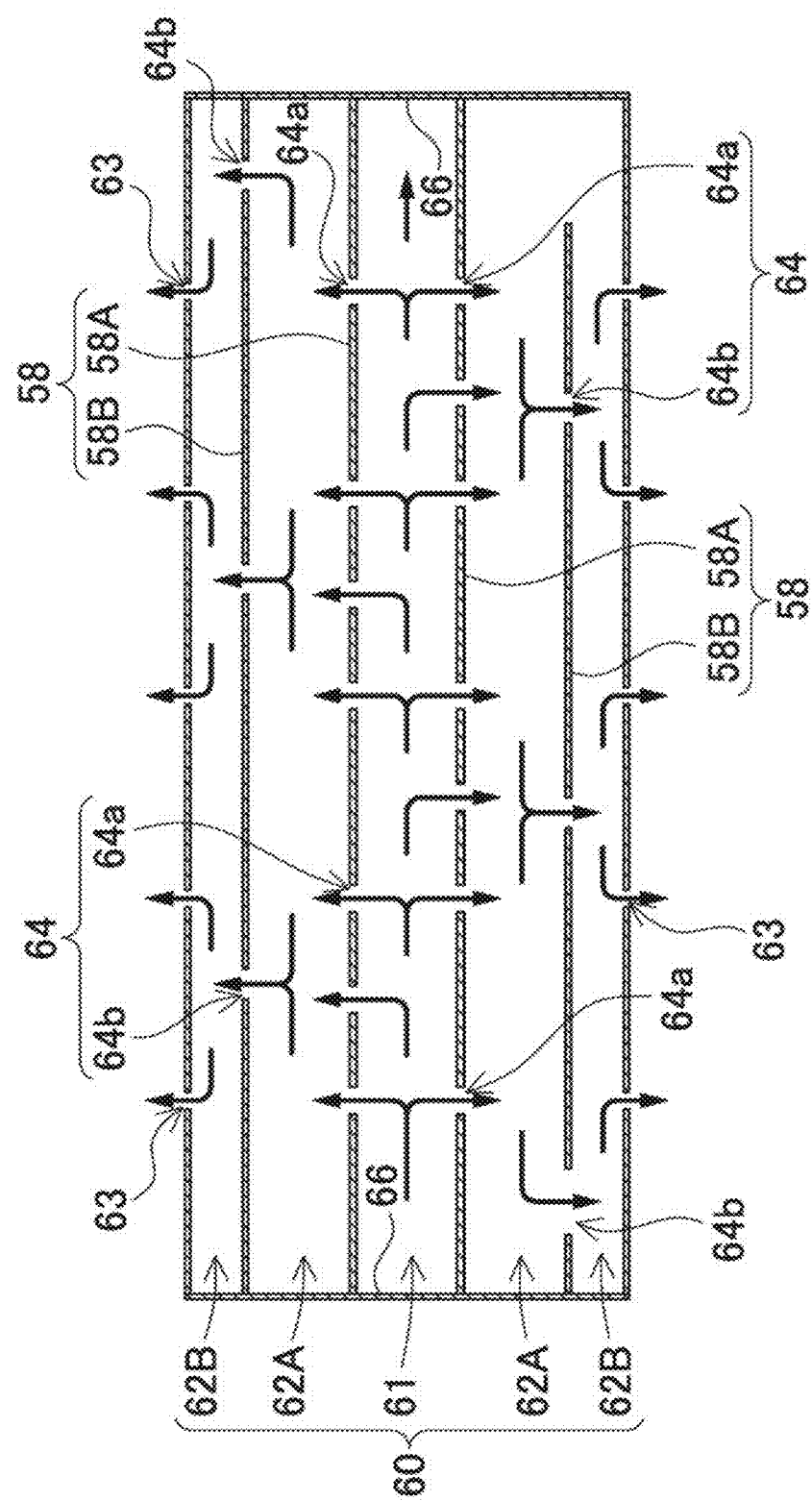

ELECTRIC POWER SOURCE DEVICE AND VEHICLE WITH SAME

CROSS-REFERENCE TO RELATED APPLICATIONS

This application is a U.S. national stage application of the PCT International Application No. PCT/JP2019/019679 filed on May 17, 2019, which claims the benefit of foreign priority of Japanese patent application No. 2018-120848 filed on Jun. 26, 2018, the contents all of which are incorporated herein by reference.

TECHNICAL FIELD

The present invention relates to a power supply device and a vehicle equipped with the power supply device.

BACKGROUND ART

A power supply device is used for driving a vehicle or the like. Such a power supply device is capable of outputting a large current by connecting many secondary battery cells in series or in parallel. In recent years, secondary battery cells have been increased in capacity, and how to implement measures against heating and burning of secondary battery cells has become an issue. In particular, secondary battery cells with high capacity have high battery energy, so that ensuring safety is important.

The secondary battery cells each include an exterior can inside which an electrode and an electrolyte solution are sealed. To release high-pressure gas inside from the exterior can when internal pressure of the exterior can rises due to thermal runaway or the like, a gas discharge valve is provided. The high-pressure gas has a high temperature, so that a power supply device formed by connecting many secondary battery cells is required to promptly discharge the high-pressure gas to the outside of the power supply device when such high-pressure gas is generated in some of the secondary battery cells. For this reason, a structure of a power supply device is known in which a gas duct is connected to a gas discharge valve for discharging high-pressure gas (e.g., refer to PTL 1).

CITATION LIST

Patent Literature

PTL 1: International Publication No. WO 2014/024433

SUMMARY OF THE INVENTION

Technical Problem

The power supply device of PTL 1 is configured such that the gas duct has a small exhaust port to prevent fragments of the gas discharge valve from flowing out to the outside. Although this structure enables preventing fragments of the gas discharge valve and contents of the secondary battery cell from flowing out to the outside, discharge efficiency of the high-pressure gas may be deteriorated to increase internal pressure of the high-pressure gas, and then temperature may rise.

The present invention is made in view of such a background, and it is an object of the present invention to provide a power supply device capable of reducing a temperature rise of high-pressure gas while preventing fragments of a gas discharge valve and contents of a secondary battery cell from flowing out to the outside, and a vehicle equipped with the power supply device.

A power supply device according to an exemplary embodiment of the present invention includes a plurality of secondary battery cells each having a gas discharge valve for discharging internal gas, and a cover part disposed on one surface of a battery stack with the plurality of secondary battery cells stacked, and covering the gas discharge valve of each of the plurality of secondary battery cells, the cover part being provided inside with a gas guide path partitioned to discharge gas discharged from the gas discharge valve to an outside of the cover part, and the gas guide path including one or more horizontal gas flow bending portions that bend at least a flow direction of some of the gas in plan view of the cover part.

The above structure causes a flow direction of gas discharged from the gas discharge valve to be bent. This enables damming solids and liquids other than gas, such as fragments of the gas discharge valve and the contents of the secondary battery cell in front of the horizontal gas flow bending portion using a difference in straightness. Thus, the gas guide path is not required to be reduced in sectional area, so that increase in internal pressure of the gas guide path due to the gas discharged from the gas discharge valve can be reduced, and a temperature rise of the gas discharged from the gas discharge valve can be reduced.

BRIEF DESCRIPTION OF DRAWINGS

FIG. 4B is a schematic diagram illustrating a main path and a sub-path of the power supply device of FIG. 4A.

DESCRIPTION OF EMBODIMENTS

Figure 1:
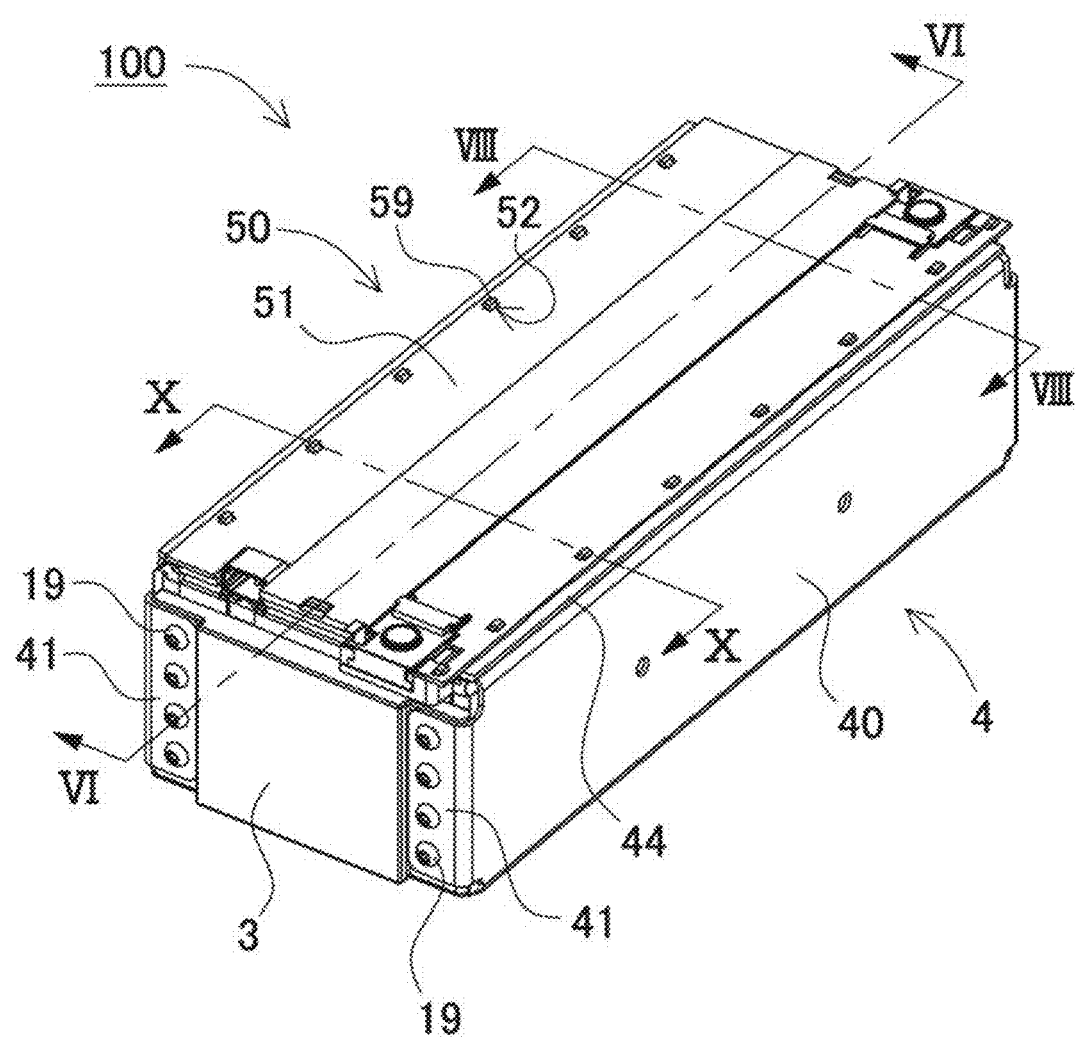
FIG. 1 is a schematic perspective view of a power supply device according to a first exemplary embodiment of the present invention.

In recent years, power supply devices are required to be small in size. To achieve downsizing of the power supply devices, a large space cannot be provided for a gas guide path for discharging gas. Then, temperature of high-pressure gas tends to rise as of a secondary battery cell increases in capacity. The inventors of the present invention have studied a structure capable of reducing a temperature rise of high-pressure gas in a limited space, and have reached the present invention.

A power supply device according to an exemplary embodiment of the present invention includes a plurality of secondary battery cells each having a gas discharge valve for discharging internal gas, and a cover part disposed on one surface of a battery stack with the plurality of secondary battery cells stacked, and covering the gas discharge valve of each of the plurality of secondary battery cells, the cover part being provided inside with a gas guide path partitioned to discharge gas discharged from the gas discharge valve to an outside of the cover part, and the gas guide path including one or more horizontal gas flow bending portions that bend at least a flow direction of some of the gas in plan view of the cover part.

The above structure causes a flow direction of gas discharged from the gas discharge valve to be bent. This enables damming solids and liquids other than gas, such as fragments of the gas discharge valve and the contents of the secondary battery cell in front of the horizontal gas flow bending portion using a difference in straightness. Thus, the gas guide path is not required to be reduced in sectional area, so that increase in internal pressure of the gas guide path due to the gas discharged from the gas discharge valve can be reduced, and a temperature rise of the gas discharged from the gas discharge valve can be reduced.

The gas guide path may include a vertical gas flow bending portion that bends at least a flow direction of some of the gas in longitudinal sectional view of the cover part. The above structure enables the flow direction of the gas to be bent by the vertical gas flow bending portion in addition to the horizontal gas flow bending portion. In particular, forming the gas guide path in a three-dimensional manner by increasing the number of bends and changing a bending direction enables a limited space to be effectively utilized.

The gas guide path may further include a linear main path facing each gas discharge valve of the plurality of secondary battery cells, and at least one first sub-path disposed adjacent to the main path. The main path and the at least one first sub-path may be connected via the horizontal gas flow bending portion.

The horizontal gas flow bending portion may be an opening formed in a wall surface defining the main path.

The horizontal gas flow bending portion formed in the main path may have a total sum of opening areas that is larger than a sectional area of the main path. The above structure enables reducing increase in internal pressure of the main path by smoothly discharging gas discharged to the main path, so that a temperature rise of the gas can be reduced.

The gas guide path may further include at least one second sub-path disposed adjacent to the at least one first sub-path, and the first sub-path and the second sub-path may be connected via the vertical gas flow bending portion.

The vertical gas flow bending portion may be an opening formed in a wall surface defining the first sub-path, and may have a total sum of opening areas that is larger than a sectional area of the first sub-path. The above structure enables reducing increase in internal pressure of the first sub-path, so that a temperature rise of gas can be reduced.

A main-path cover made of metal covering the main path from above may be provided.

The cover part may include an upper cover covering the gas guide path including an upper surface of the main-path cover from above. The above structure enables the cover part to also serve as a gas duct for discharging gas.

The vertical gas flow bending portion may be formed on a bottom surface side of the upper cover, and a gap may be formed between an end edge of the vertical gas flow bending portion and a floor surface of the gas guide path. The above structure enables the gas guide path to be changed in a height direction using the vertical gas flow bending portion protruding downward from above the gas guide path.

Bus bars made of metal for connecting electrode terminals of the plurality of secondary battery cells may be provided. The cover part may include a holder part for holding the bus bars, and the holder part may include a wall portion erected partitioning the gas guide path. The above structure enables the cover part defining the gas guide path to also serve as a bus bar holder holding the bus bars.

Additionally, the holder part may include a locking hook for locking the upper cover. The gas guide path defined by the wall portion in an upper surface of the holder part may open upward, and the upper cover may be locked with the locking hook to cover the gas guide path with the upper cover from above. The locking hook may include a claw portion projecting upward in a claw shape in each of side surface regions on both sides of the holder part, parallel to a stacked direction of the secondary battery cell, the claw portion having an inclined surface formed outward of the holder part while spreading out, and a locking surface formed extending from the inclined surface of the claw portion at an acute angle. The upper cover may include a locking hole opened on a side surface side corresponding to the locking hook to allow the claw portion of the locking hook to be inserted into the locking hole. The upper cover may be locked with the holder part by inserting the locking hook into the locking hole and bringing the locking surface of the claw portion into contact with a region positioned within an opening end edge of the locking hole and outside the upper cover. The above structure allows the upper cover to be deformed swelling upward when an internal pressure is applied to the upper cover when gas is discharged, so that the deformation acts in a direction allowing the locking hook and the locking hole to be more locked, and thus a connected state of the upper cover is firmly maintained to prevent the upper cover from falling off, for example.

The horizontal gas flow bending portion may be configured to reverse at least a flow direction of some of gas.

The gas guide path may have end surface walls disposed at opposite ends in the stacked direction of the secondary battery cells. The above structure prevents high-pressure gas guided by the gas guide path from escaping to opposite ends under high pressure maintained and discharges the high-pressure gas by causing a pressure loss to enable improving safety.

The cover part may constitute an exhaust port for discharging the gas guided from the gas discharge valve to the gas guide path to the outside of the power supply device, and the battery stack has the plurality of secondary battery cells stacked. The exhaust port may be formed in a direction intersecting a stacking direction of the secondary battery cells.

The bus bars may be disposed inside the gas guide path and in front of the exhaust port. The above structure allows gas exhausted from the gas discharge valve to be brought into contact with the bus bars made of metal before being discharged from the exhaust port to the outside of the power supply device, so that the bus bars remove heat of the gas to enable reducing temperature of the gas, and thus effect of improving safety can be obtained by reducing temperature of the gas at the time of being discharged to the outside of the power supply device.

The power supply device may also include a thermal fuse disposed in the gas guide path to detect gas discharge. The above structure enables the gas discharge to be detected by operating the thermal fuse with high-pressure gas guided to the gas guide path.

A vehicle according to an exemplary embodiment of the present invention includes the power supply device, a motor for traveling supplied with electric power from the power supply device, a vehicle body mounted with the power supply device and the motor, and wheels driven by the motor to allow the vehicle body to travel.

Hereinafter, exemplary embodiments of the present invention will be described with reference to the drawings. However, the exemplary embodiments described below are examples for embodying the technical idea of the present invention, and the present invention is not limited to the following. The present specification does not limit the members illustrated in the scope of claims to the members of the exemplary embodiments. In particular, dimensions, materials, shapes, relative placement, and the like of components described in the exemplary embodiments are not intended to limit the scope of the present invention to only those, and are merely explanatory examples unless otherwise specified. To clarify description, sizes and a positional relationship of members illustrated in each drawing may be exaggerated. In the following description, a member identical in name and reference numeral indicates an identical member or a member identical in quality, and detailed description thereof will be eliminated as appropriate. Each element constituting the present invention may be configured such that a plurality of elements is composed of one member to allow the one member to serve as the plurality of elements, or conversely, a function of one member may be achieved by sharing with the plurality of members.

The power supply device according to each exemplary embodiment is used for various applications including: a power source mounted on an electric vehicle such as a hybrid vehicle or an electric vehicle to supply electric power to a traveling motor; a power supply for storing generated power of natural energy such as solar power generation or wind power generation; a power source for storing midnight power; and the like, and is particularly used as a power source suitable for an application with a large amount of power and a large current.

First Exemplary Embodiment

Figure 2:
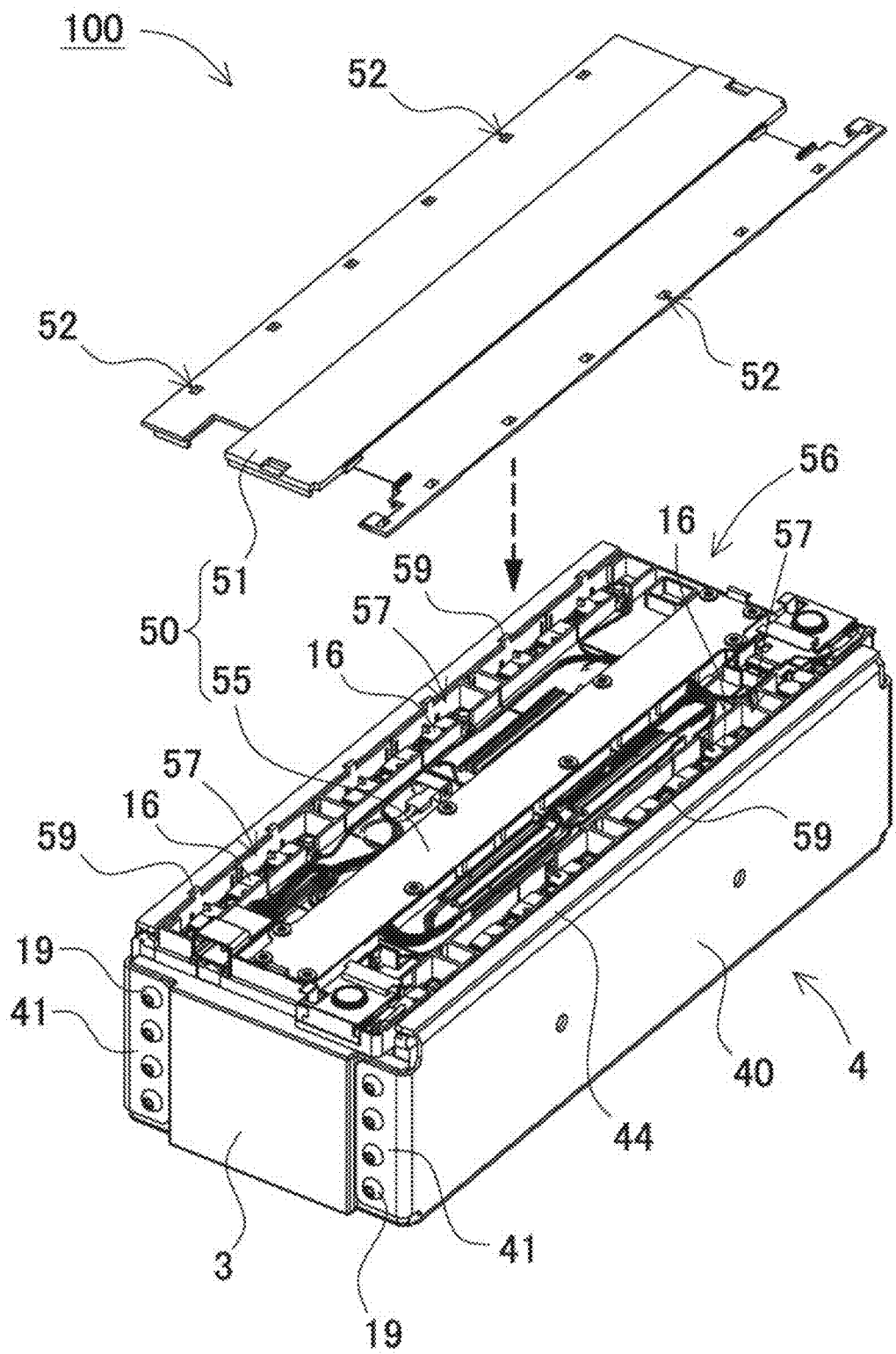
FIG. 2 is a perspective view illustrating a state in which an upper cover is removed from the power supply device of FIG. 1.
Figure 3:
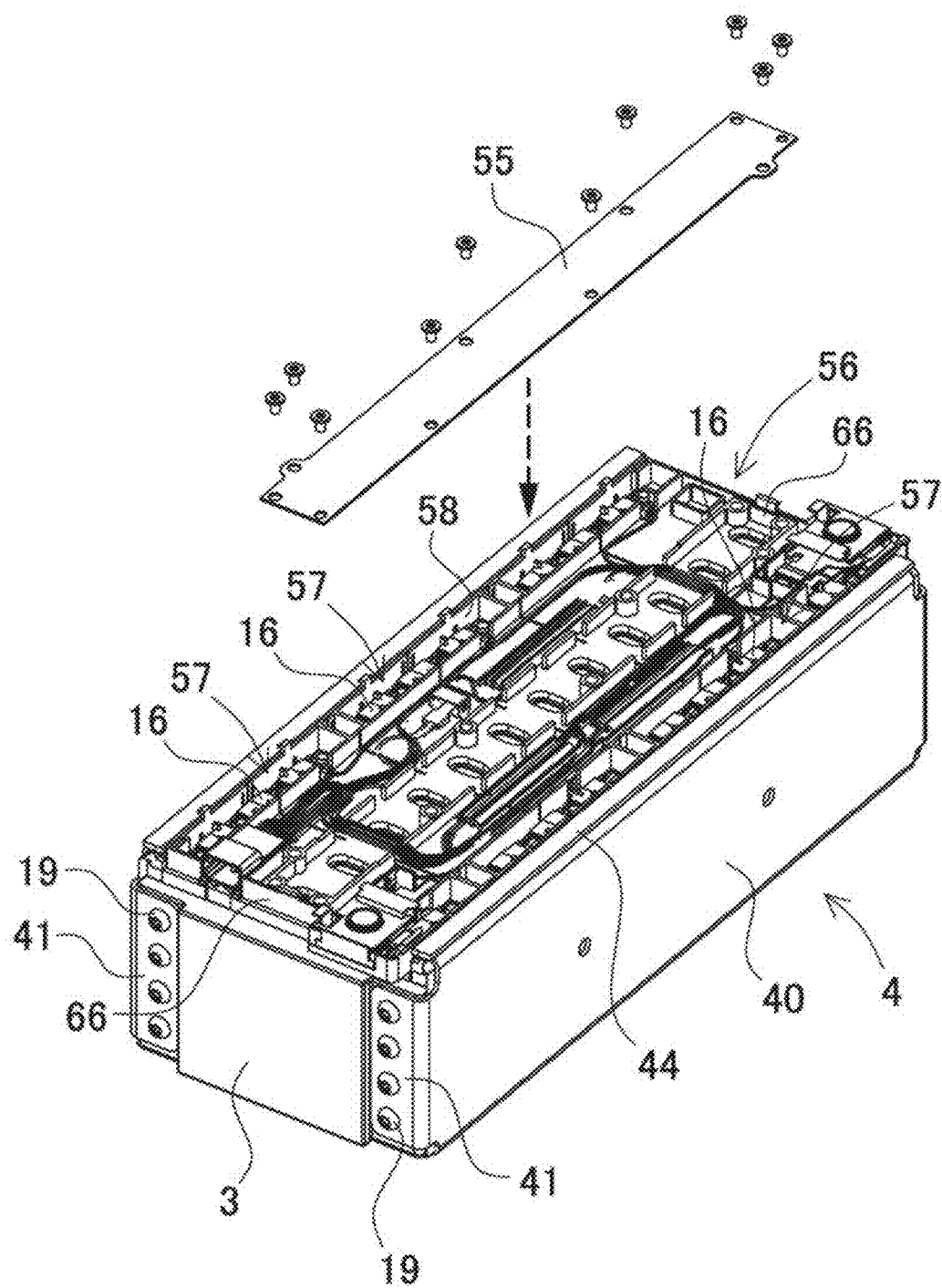
FIG. 3 is a perspective view illustrating a state in which a main-path cover is removed from the power supply device of FIG. 2.
Figure 4A:
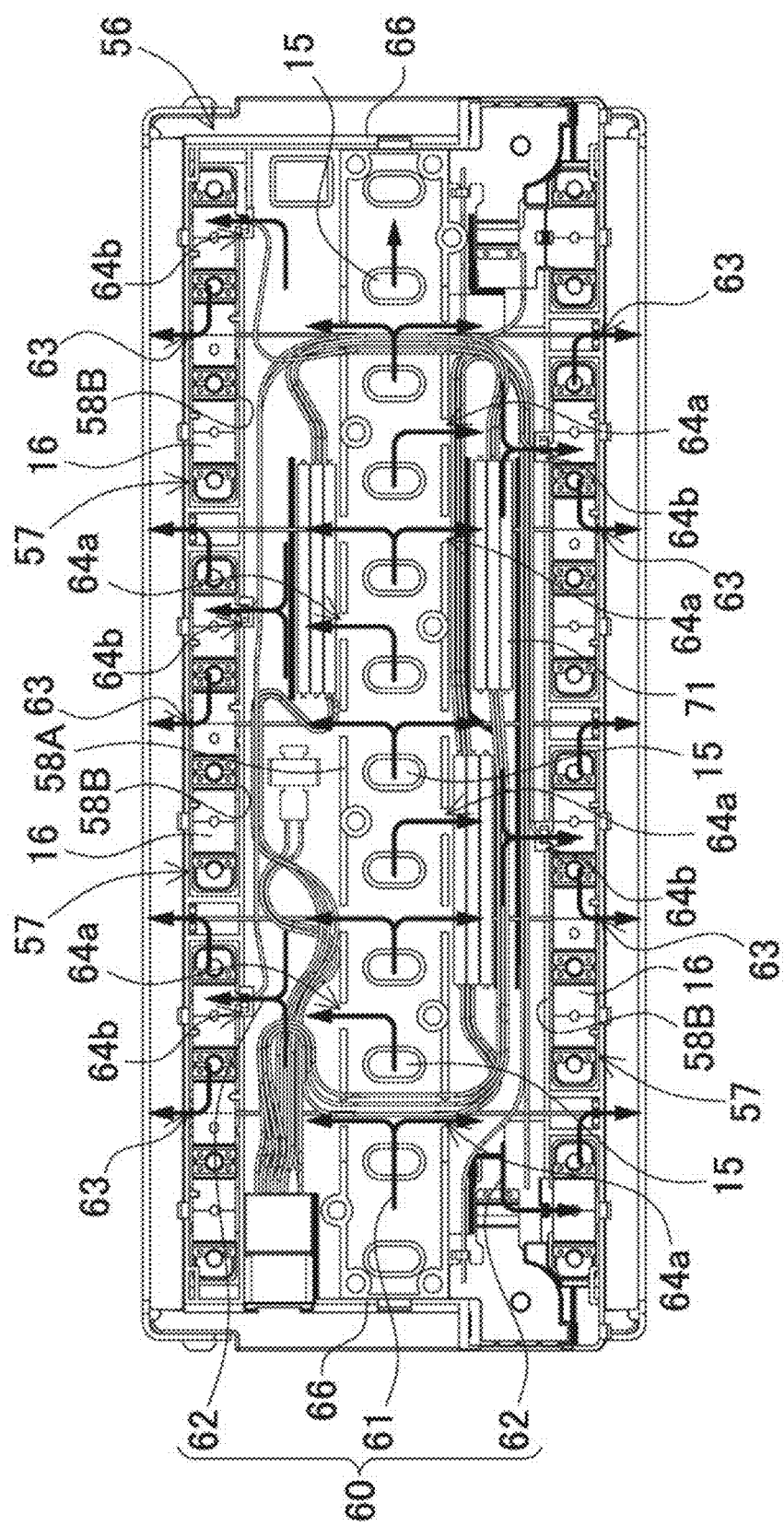
FIG. 4A is a plan view of the power supply device of FIG. 3.
Figure 5:
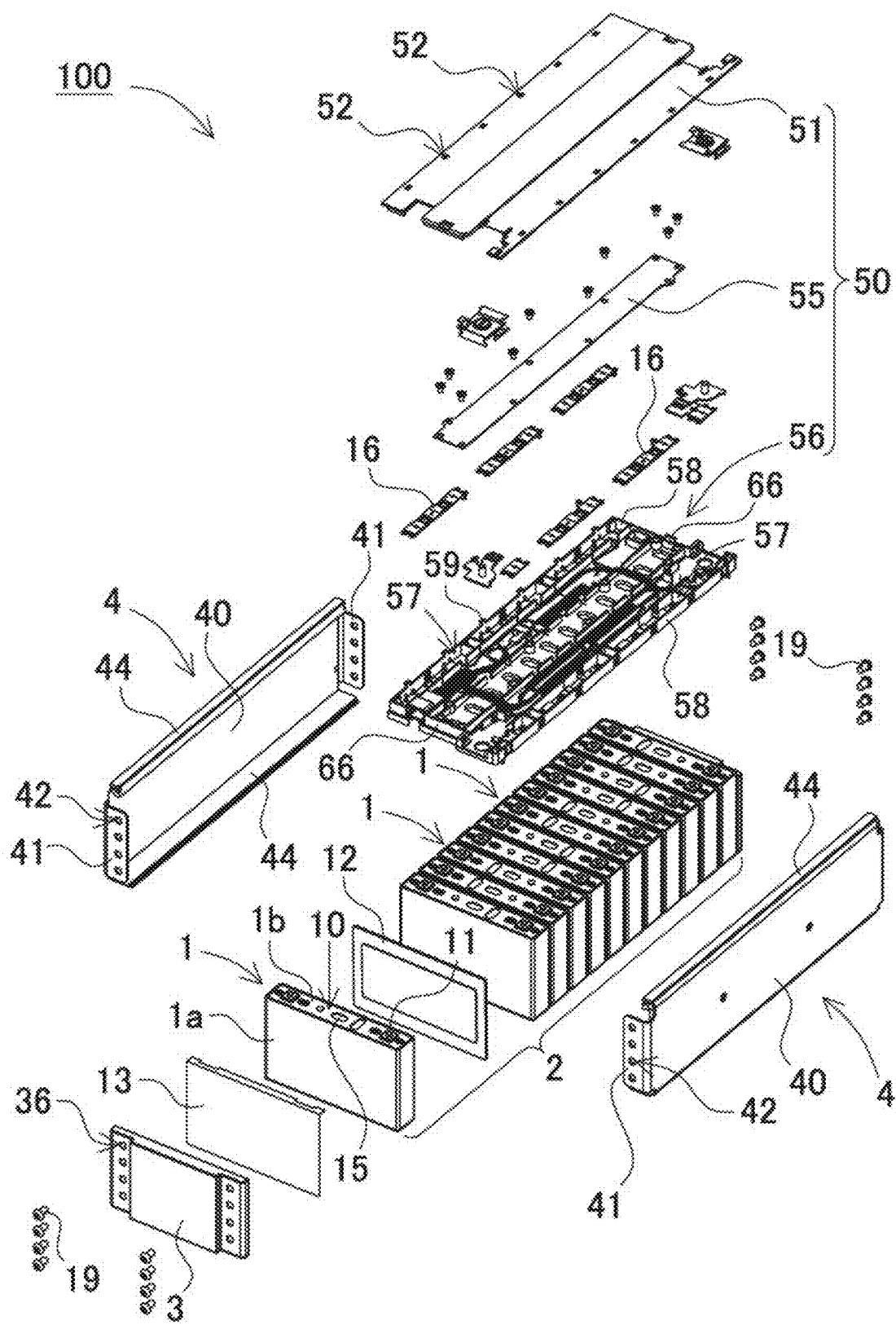
FIG. 5 is an exploded perspective view of the power supply device of FIG. 3.
Figure 6:
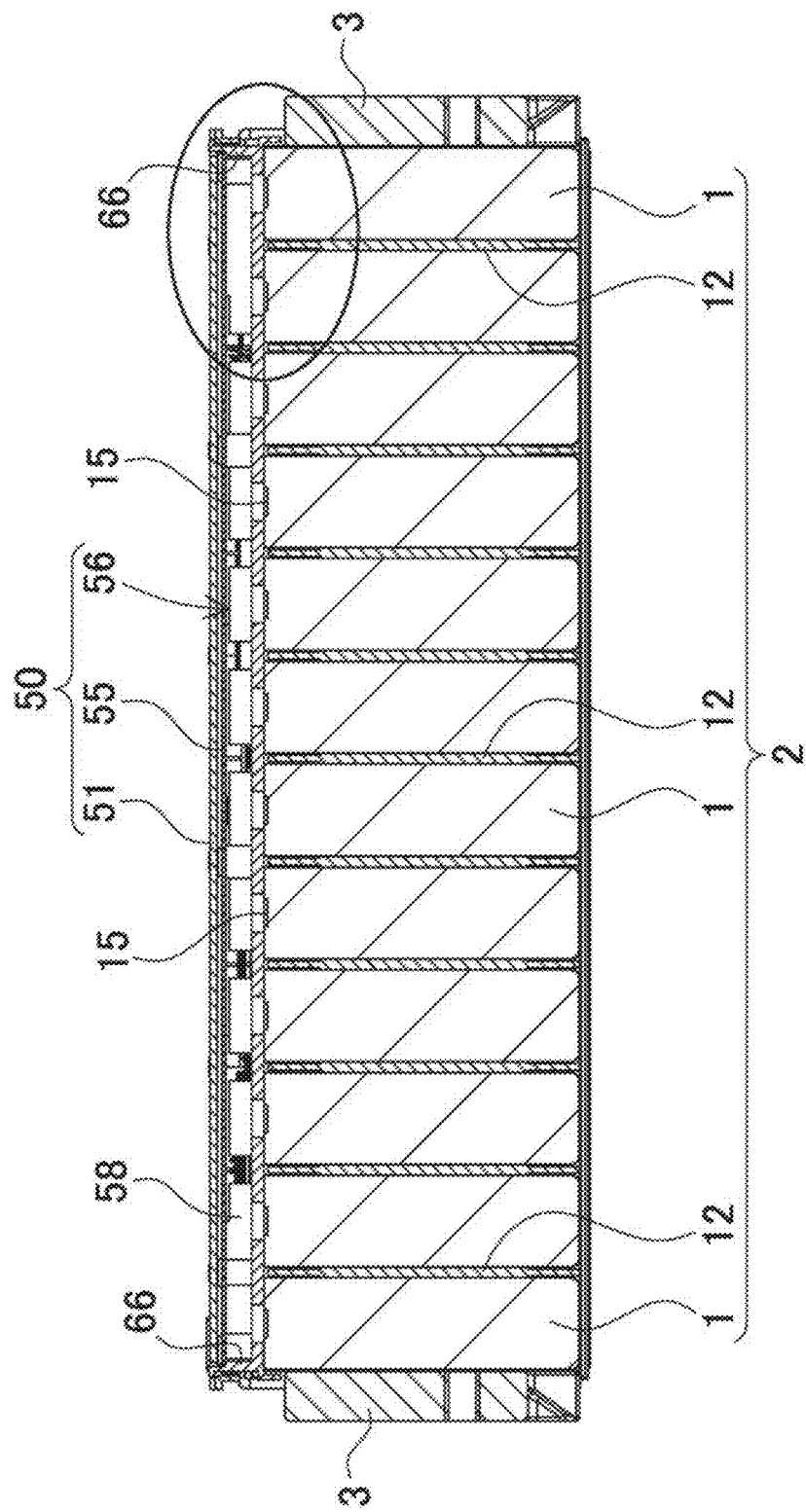
FIG. 6 is a longitudinal sectional view taken along line VI-VI in FIG. 1.

FIGS. 1 to 5 each illustrate a power supply device according to a first exemplary embodiment of the present invention. In these drawings, FIG. 1 is a perspective view of power supply device 100, FIG. 2 is a perspective view of power supply device 100 of FIG. 1 with upper cover 51 removed, FIG. 3 is a perspective view of main-path cover 55 removed from FIG. 2, FIG. 4A is a plan view of power supply device 100 of FIG. 3 (with main-path cover 55 removed), FIG. 4B is a schematic view illustrating a main path and a sub-path of the power supply of FIG. 4A, and FIG. 5 is an exploded perspective view of power supply device 100 of FIG. 1. Power supply device 100 illustrated in these drawings includes battery stack 2 in which a plurality of secondary battery cells 1 is stacked, a pair of end plates 3 disposed at opposite ends of battery stack 2, and a pair of fastening members 4 connected at opposite ends to the respective pair of end plates 3 to fasten battery stack 2. Fastening members 4 each provided in power supply device 100 include body portion 40 disposed along a side surface of battery stack 2, and fixing portions 41 that are bent at opposite ends of body portion 40 and fixed to outer surfaces of respective end plates 3.

(Secondary Battery Cell 1)

As illustrated in FIG. 5, secondary battery cell 1 is a square battery having a width wider than a thickness, in other words, a prismatic battery thinner than the width, and is stacked in its thickness direction to form battery stack 2. Secondary battery cell 1 is a lithium ion secondary battery. However, the secondary battery cell may be any rechargeable secondary battery such as a nickel hydrogen battery or a nickel cadmium battery. Secondary battery cell 1 includes exterior can 1a that has a closed structure and houses positive and negative electrode plates together with an electrolyte solution. Exterior can 1a is formed by pressing a metal sheet such as aluminum or aluminum alloy into a rectangular shape, and has an opening that is hermetically sealed with sealing plate 1b. Sealing plate 1b is made of the same aluminum or aluminum alloy as that of exterior can 1a, and includes positive and negative electrode terminals 11 fixed to its opposite end portions. Sealing plate 1b is further provided with gas discharge valve 15 between positive and negative electrode terminals 11.

The plurality of secondary battery cells 1 is stacked in a thickness direction of each secondary battery cell 1, being set as the stacking direction, to form battery stack 2. The plurality of secondary battery cells 1 is each stacked by disposing terminal surface 10 provided with positive and negative electrode terminals 11 on the same plane to form battery stack 2.

(Separator 12)

As illustrated in FIG. 5, battery stack 2 includes secondary battery cells 1 stacked with separator 12 interposed therebetween. Separator 12 in the drawing is formed in the shape of a thin plate or sheet using an insulating material. Separator 12 illustrated in the drawing has a plate shape that is substantially identical in size to a facing surface of secondary battery cell 1, and separator 12 is interposed between stacked secondary battery cells 1 adjacent to each other to insulate adjacent secondary battery cells 1 from each other. Although not illustrated, separator 12 may have a shape allowing a flow path of a cooling gas to be formed between secondary battery cell 1 and a spacer. Secondary battery cell 1 may have a surface covered with an insulating material. For example, exterior can 1a may have a surface excluding an electrode portion of the secondary battery cell, being heat-welded with a shrink tube of PET resin or the like.

(Battery Stack 2)

Battery stack 2 includes metal bus bar 16 connected to positive and negative electrode terminals 11 of adjacent secondary battery cells 1, and the plurality of secondary battery cells 1 is connected in series or in parallel, or in series and in parallel using bus bars 16. Battery stack 2 illustrated in the drawing includes twelve secondary battery cells 1 connected in series. However, the present invention does not specify the number of secondary battery cells constituting the battery stack and the connection state thereof.

(End Surface Spacer 13)

Battery stack 2 includes end plates 3 that are disposed on its opposite end surfaces with respective end surface spacers 13 interposed therebetween. As illustrated in FIG. 5, end surface spacer 13 is disposed between battery stack 2 and end plate 3 to insulate end plate 3 from battery stack 2. End surface spacer 13 may be made of a material similar to that of separator 12 described above.

(End Plate 3)

As illustrated in FIGS. 1 to 5, end plates 3 are disposed at opposite ends of battery stack 2 and are fastened via fastening members 4 disposed along both side surfaces of battery stack 2. End plates 3 are disposed at both the ends of battery stack 2 in the stacking direction of secondary battery cells 1 and outside respective end surface spacers 13 to sandwich battery stack 2 from both the ends.

End plate 3 has a quadrangular outer shape, and is disposed facing the end surface of battery stack 2. End plate 3 illustrated in FIGS. 1 to 5 has an outer shape substantially identical to an outer shape of secondary battery cell 1. That is, end plate 3 illustrated in the drawings has a width in a left-right direction equal to a width of secondary battery cell 1 and a height in a vertical direction equal to a height of secondary battery cell 1. The present specification indicates the vertical direction that means a vertical direction in each drawing, and the left-right direction that means a left-right direction in each drawing and means a horizontal direction orthogonal to the stacking direction of the batteries.

End plate 3 illustrated in FIG. 5 is further formed with a plurality of through-holes for fixing end plate 3. For example, end plate 3 includes first through-hole 36 for inserting fastener 19 that fixes fixing portion 41 of fastening member 4. End plate 3 illustrated in the drawing includes a plurality of through-holes each opened as first through-hole 36. End plate 3 of FIG. 5 includes the plurality of first through-holes 36 provided at vertical intervals at respective positions in its both side portions facing fixing portion 41. End plate 3 of FIG. 5 is provided with three first through-holes 36 along each side, thus totaling to six first through-holes 36. This end plate 3 is configured such that fastener 19 passing through fixing portion 41 disposed on an outer peripheral surface of end plate 3 is inserted into each of first through-holes 36. Fastener 19 inserted into first through hole 36 is fixed to first through-hole 36 to fix fixing portion 41 at a predetermined position.

(Fastening Member 4)

As illustrated in FIGS. 1 to 5, fastening member 4 extends in the stacking direction of battery stack 2, and has opposite ends fixed to respective end plates 3 disposed on opposite end surfaces of battery stack 2. Then, battery stack 2 is fastened in the stacking direction via end plates 3. Fastening members 4 are each a metal sheet having a predetermined width along the side surface of battery stack 2 and a predetermined thickness, and are disposed facing both the respective side surfaces of battery stack 2. For fastening member 4, a metal sheet such as iron, preferably a steel plate can be used. Fastening member 4 made of a metal sheet is bent into a predetermined shape by press forming or the like.

Fastening member 4 includes body portion 40 disposed along a side surface of battery stack 2, and fixing portions 41 that are bent at opposite ends of body portion 40 and fixed to outer surfaces of respective end plates 3. Body portion 40 has a rectangular shape having a size covering almost the whole of battery stack 2 and end plates 3 disposed at opposite ends of battery stack 2. Body portion 40 illustrated in FIG. 1 is provided covering almost the whole area of the side surface of battery stack 2 without a gap. However, body portion 40 may be provided with one or more openings to expose a part of the side surface of the battery stack. To fix opposite ends of fastening member 4 to the respective pair of end plates 3, fastening member 4 includes fixing portions 41 that are each formed by bending each of opposite end portions of fastening member 4 along an outer surface of end plate 3 at each of opposite ends of fastening member 4. Fixing portions 41 illustrated in the drawing are each substantially equal in vertical height to body portion 40 and end plate 3, and are provided covering left and right side portions of respective end plates 3. This fastening member 4 is fixed to end plate 3 via fastener 19 inserted into through-hole 42 provided in a leading end portion of fixing portion 41. Fastening member 4 illustrated in the drawing further includes bent portions 44 that are each provided along an upper end portion of an intermediate portion excluding opposite end portions of body portion 40 to hold an upper surface and a lower surface of battery stack 2. Bent portions 44 hold upper surfaces and lower surfaces of secondary battery cells 1 constituting battery stack 2 to prevent terminal surface 10 of each secondary battery cell 1 from being vertically displaced in position.

Although not illustrated, fastening member 4 may include an insulating sheet disposed on inner surfaces of body portion 40 and bent portion 44 so that the insulating sheet can insulate secondary battery cell 1 of battery stack 2 from fastening member 4. Although not illustrated, fastening member 4 may also include a cushioning material on each of inner surfaces of the opposite end portions of body portion 40 to protect opposite side surfaces of end plate 3 from shock such as vibration.

(Cover Part 50)

As illustrated in FIG. 5, power supply device 100 includes cover part 50 covering the upper surface of battery stack 2. Cover part 50 is provided partitioning gas guide path 60 inside cover part 50 to discharge gas discharged from gas discharge valve 15 to the outside of cover part 50. In this way, cover part 50 also serves as a gas duct for discharging gas, so that a labor of separately preparing a gas duct and piping it to a holder as in conventional cases can be saved, and thus has advantages of simplification of structure, weight reduction, and cost reduction. This cover part 50 includes holder part 56, main-path cover 55, and upper cover 51.

(Holder Part 56)

As illustrated in FIG. 5, holder part 56 is provided on its upper surface with bus bar holding parts 57 for holding bus bars 16. When holder part 56 is placed on the upper surface of battery stack 2 with bus bars 16 disposed on respective bus bar holding parts 57, respective bus bars 16 can be positioned with respect to the corresponding secondary battery cells. Holder part 56 also includes wall portion 58 erected partitioning gas guide path 60. Using cover part 50 defining gas guide path 60 as a bus bar holder holding bus bars 16 as described above enables further simplification of the structure.

(Wall Portion 58)

Holder part 56 includes wall portions 58 erected partitioning gas guide path 60. Gas guide path 60 partitioned by wall portions 58 opens upward. When an upper surface of holder part 56 is covered with cover part 50, gas guide path 60 is closed from above. Holder part 56 includes main path 61 and sub-path 62 defined by wall portions 58 as gas guide path 60.

(Main Path 61)

Main path 61 is formed linearly facing gas discharge valve 15 of each of secondary battery cells 1 stacked. The battery stack 2 includes a plurality of secondary battery cells 1 that are each in a square shape and are stacked while having surfaces that are each provided with gas discharge valve 15 and are flush with each other. Gas discharge valve 15 is disposed substantially in the center of sealing plate 1b of each secondary battery cell 1. Thus, when main path 61 is disposed substantially in the center in a lateral direction of holder part 56 extended in a rectangular shape as illustrated in FIG. 4A and the like, each gas discharge valve 15 can communicate with main path 61 when opened. Main path 61 also communicates with sub-path 62, and communicates with exhaust port 63 through sub-path 62. Exhaust port 63 is an opening for discharging gas from cover part 50 to the outside.

(Sub-Path 62)

One or more sub-paths 62 are provided substantially parallel to main path 61. One or more sub-paths 62 are disposed on both sides across main path 61 disposed in the center of cover part 50. FIG. 4B illustrates an example in which two sub-paths 62 including first sub-path 62A and second sub-path 62B are provided above and below main path 61, respectively. Including sub-path 62 in gas guide path 60 as described above enables gas momentum to be reduced by increasing a path length more than when main path 61 is alone. In particular, there is technical significance in that gas guide path 60 can be increased in path length by effectively utilizing a limited space above the power supply device.

(Main-Path Cover 55) Main path 61 is formed in an elongated shape extending in the stacking direction of secondary battery cells 1. Main path 61 is covered with main-path cover 55 from above. Main-path cover 55 is preferably made of a metal sheet.

(Upper Cover 51)

Power supply device 100 illustrated in FIG. 1 has an upper surface on which upper cover 51 is disposed. Upper cover 51 is made of a material having excellent insulating properties, such as resin. Main-path cover 55 made of metal is disposed in a central portion as illustrated in FIG. 2 that is a perspective view of power supply device 100 of FIG. 1 with upper cover 51 removed. Cover part 50 define gas guide path 60 together with holder part 56, cover part 50 including main-path cover 55 and upper cover 51 as illustrated in the perspective view of FIG. 3 illustrating the state in which main-path cover is removed from FIG. 2 and the plan view of FIG. 4A in which main-path cover 55 is removed from FIG. 3.

(Gas Guide Path 60)

Figure 7:
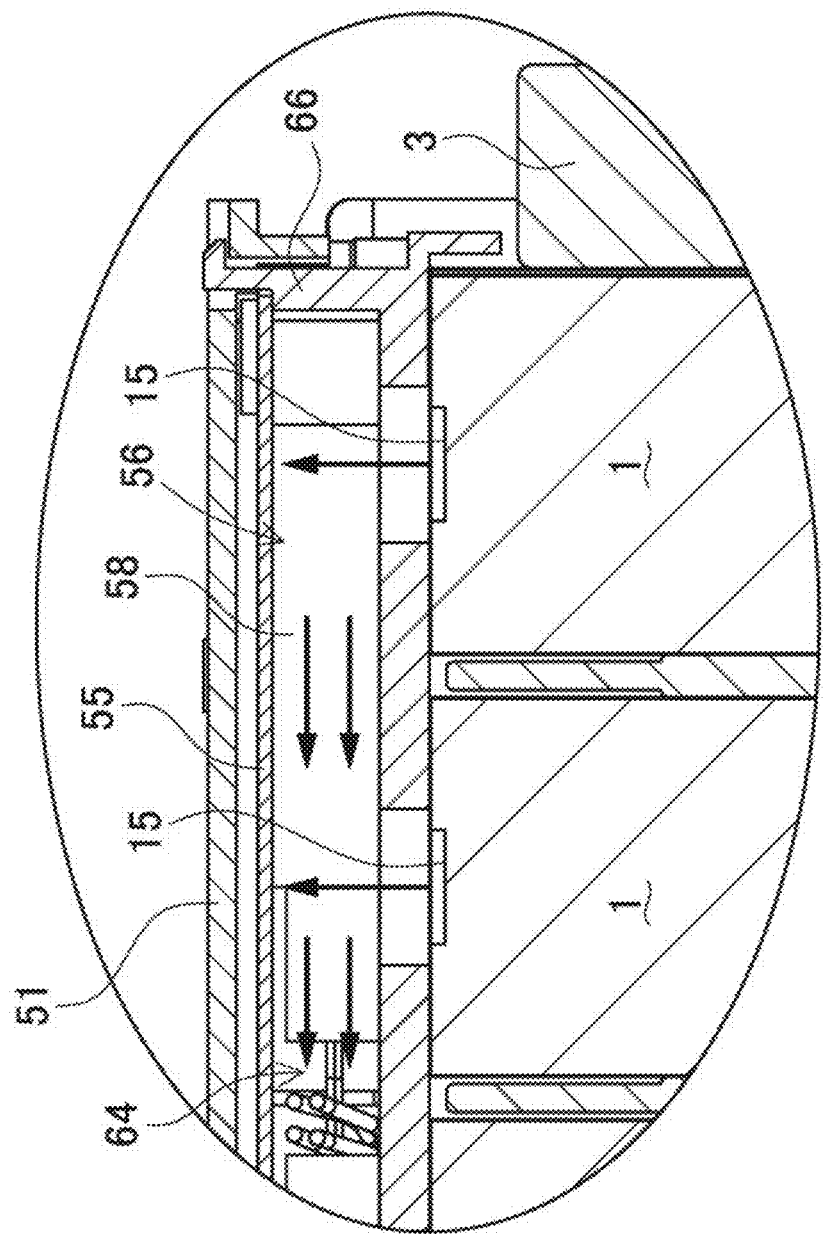
FIG. 7 is a partially enlarged view of FIG. 6.

Gas guide path 60 is made of metal and heat-resistant resin, and functions as a gas duct. As illustrated in FIG. 2, gas guide path 60 has an upper surface covered with main-path cover 55 made of metal. This enable gas at high temperature and under high pressure discharged from gas discharge valve 15 to be received with sufficient strength as illustrated in FIG. 7. Gas guide path 60 has a side surface that is also made of metal.

Main-path cover 55 has an upper surface that is further covered with upper cover 51 made of heat-resistant resin. When the upper surface of main-path cover 55 made of metal is covered with upper cover 51, sufficient strength to withstand gas at high temperature and under high pressure can be exerted.

(Horizontal Gas Flow Bending Portion 64)

Gas guide path 60 includes one or more horizontal gas flow bending portions 64 that bend at least a flow direction of some of gas in plan view of cover part 50. This causes gas discharged from the gas discharge valve of secondary battery cell 1 to have a flow direction that is bent while gas discharged from gas discharge valve 15 is discharged to the outside of cover part 50 through gas guide path 60. This enables damming solids and liquids other than gas, such as fragments of gas discharge valve 15 and the contents of the secondary battery cell in front of horizontal gas flow bending portion 64 using a difference in straightness.

The perspective view of FIG. 3 illustrates a path through which gas discharged from gas discharge valve 15 of secondary battery cell 1 is discharged from exhaust port 63, the path being indicated by arrows. When gas guide path 60 is formed to cause a flow of gas to be bent multiple times before the gas is exhausted, as described above, solids and liquids other than gas, such as fragments of gas discharge valve 15 and contents of the secondary battery cell can be prevented from flowing out to the outside. Although FIG. 3 indicates the arrows for only sub-path 62 above main path 61 for description, it goes without saying that the same applies to the sub-path below main path 61.

(Vertical Gas Flow Bending Portion 65)

Gas guide path 60 further includes vertical gas flow bending portion 65. Vertical gas flow bending portion 65 bends at least a flow direction of some of gas in longitudinal sectional view of cover part 50. As described above, vertical gas flow bending portion 65, in addition to horizontal gas flow bending portion 64, can prevent solids and liquids other than gas, such as fragments of gas discharge valve 15 and the contents of the secondary battery cell, from flowing out to the outside.

(Details of Horizontal Gas Flow Bending Portion 64)

Horizontal gas flow bending portion 64 is formed in wall portion 58 defining main path 61. Examples of FIGS. 4A and 4B, and the like each show horizontal gas flow bending portion 64 that is composed of a plurality of openings formed in wall portion 58. The openings of horizontal gas flow bending portion 64 allow main path 61 and sub-path 62 to communicate with each other.

Horizontal gas flow bending portion 64 is provided not only in wall portion 58 that separates main path 61 and sub-path 62, but also in a wall portion that separates a sub-path and a sub-path. In the example of FIG. 4B, first opening 64a is formed in first wall portion 58A that separates main path 61 and first sub-path 62A, and second opening 64b is formed in second wall portion 58B that separates first sub-path 62A and second sub-path 62B. First opening 64a and second opening 64b are formed with an offset to be prevented from aligning with an orthogonal line orthogonal to an extension direction of main path 61 and sub-path 62. This structure enables avoiding a situation in which high-pressure gas having moved from main path 61 to first sub-path 62A through first opening 64a directly moves to second sub-path 62B through second opening 64b. That is, the high-pressure gas having moved to first sub-path 62A is required to flow through first sub-path 62A and further move to second sub-path 62B after bending at second opening 64b. Forcing the high-pressure gas to bend enables preventing solids and liquids other than the gas discharged from gas discharge valve 15 from flowing out to the outside.

Similarly, second opening 64*b* and exhaust port 63 are formed with an offset to be prevented from aligning with an orthogonal line orthogonal to the extension direction of main path 61 and sub-path 62. This enables avoiding a situation in which gas having moved to second sub-path 62B through second opening 64*b* is directly discharged to the outside of the power supply device through exhaust port 63. This also forces a flow direction of the gas to bend in exhaust port 63 after the gas flows through second sub-path 62B, so that solids and liquids other than the gas discharged from gas discharge valve 15 can be further prevented from flowing out to the outside. Repeating such bending enables preventing solids and liquids other than the gas discharged from gas discharge valve 15 from flowing out to the outside, so that a sectional area of the gas guide path is less likely to be restricted. Thus, the gas guide path can be increased in sectional area, so that effect of lowering temperature of the gas can be obtained. Then, the gas discharged from gas discharge valve 15 of secondary battery cell 1 at high temperature and under high pressure decreases in pressure and temperature while flowing through the gas guide path. This causes the gas to be considerably weakened when it is discharged from the power supply device, so that safety can be improved.

(Details of Vertical Gas Flow Bending Portion 65)

As described above, cover part 50 includes upper cover 51. Upper cover 51 is provided covering gas guide path 60 including the upper surface of main-path cover 55 from above as illustrated in FIGS. 1 and 2. This structure enables cover part 50 to also serve as a gas duct for discharging gas. Upper cover 51 is further provided on its bottom surface side with vertical gas flow bending portion 65. This vertical gas flow bending portion 65 is disposed in sub-path 62. Vertical gas flow bending portion 65 is formed on the bottom surface side of upper cover 51 as illustrated in the sectional view of FIG. 8. Additionally, a gap is formed between an end edge of vertical gas flow bending portion 65 and a floor surface of gas guide path 60. This structure enables gas guide path 60 to be changed in its height direction using vertical gas flow bending portion 65 protruding downward from an upper side of gas guide path 60. Thus, defining gas guide path 60 bent in three dimensions enables a limited space to be effectively utilized.

Figure 8:
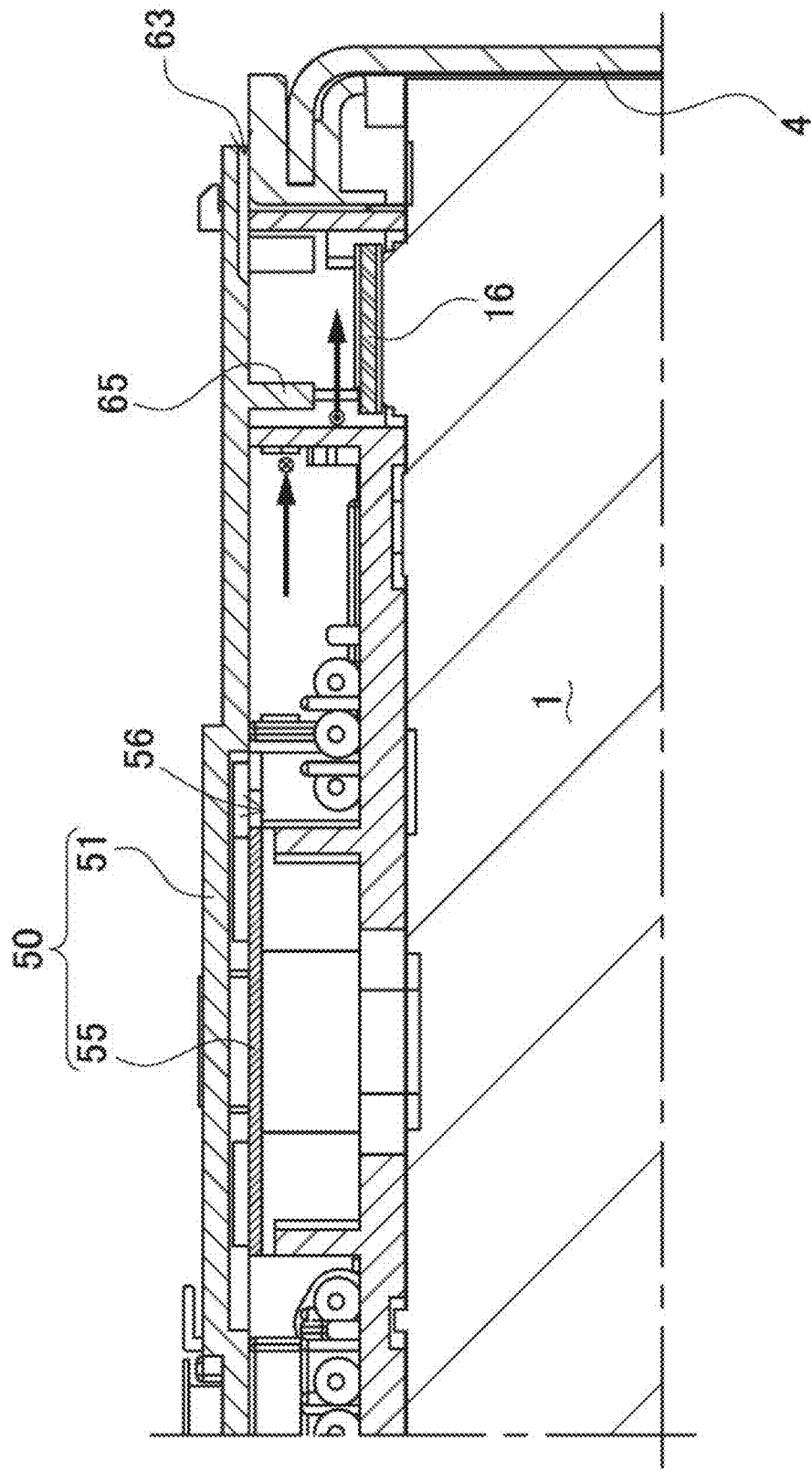
FIG. 8 is an enlarged sectional view of a main part taken along line VIII-VIII in FIG. 1.
Figure 9:
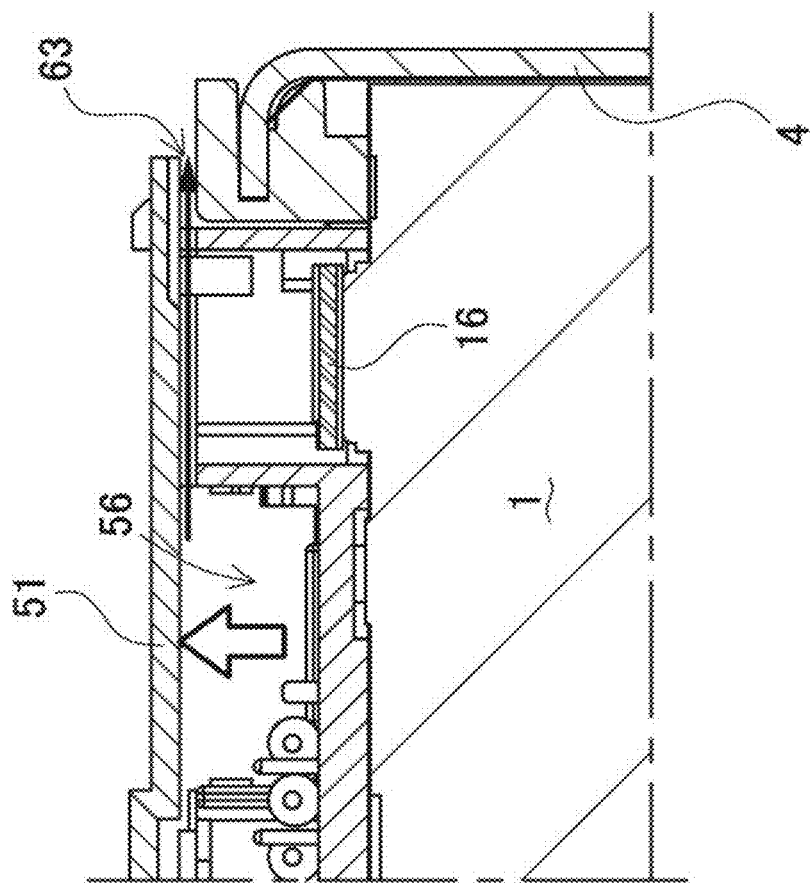
FIG. 9 is a schematic sectional view illustrating a state in which high-pressure gas is ejected in a structure without a vertical gas flow bending portion on a back surface side of an upper cover.

As illustrated in the sectional view of FIG. 8, gas guide path 60 is composed of not only vertical gas flow bending portion 65 protruding from a back surface of upper cover 51, but also wall portion 58 protruding upward from a bottom surface of holder part 56. Wall portion 58 has an upper end in contact with the bottom surface of upper cover 51. This structure enables avoiding a situation in which gas is linearly discharged to exhaust port 63. When main-path cover 55 and upper cover 51 are pushed up due to high-pressure gas ejected upward from gas discharge valve 15 in a structure provided with no vertical gas flow bending portion 65 on a back surface side of upper cover 51 as illustrated in the sectional view of FIG. 9, a gap may be formed between wall portion 58 and the bottom surface of upper cover 51, defining main path 61. Thus, it is conceivable that high-pressure gas may flow linearly to exhaust port 63 through the gap to be discharged to the outside of the power supply device while maintaining high pressure.

Figure 10:
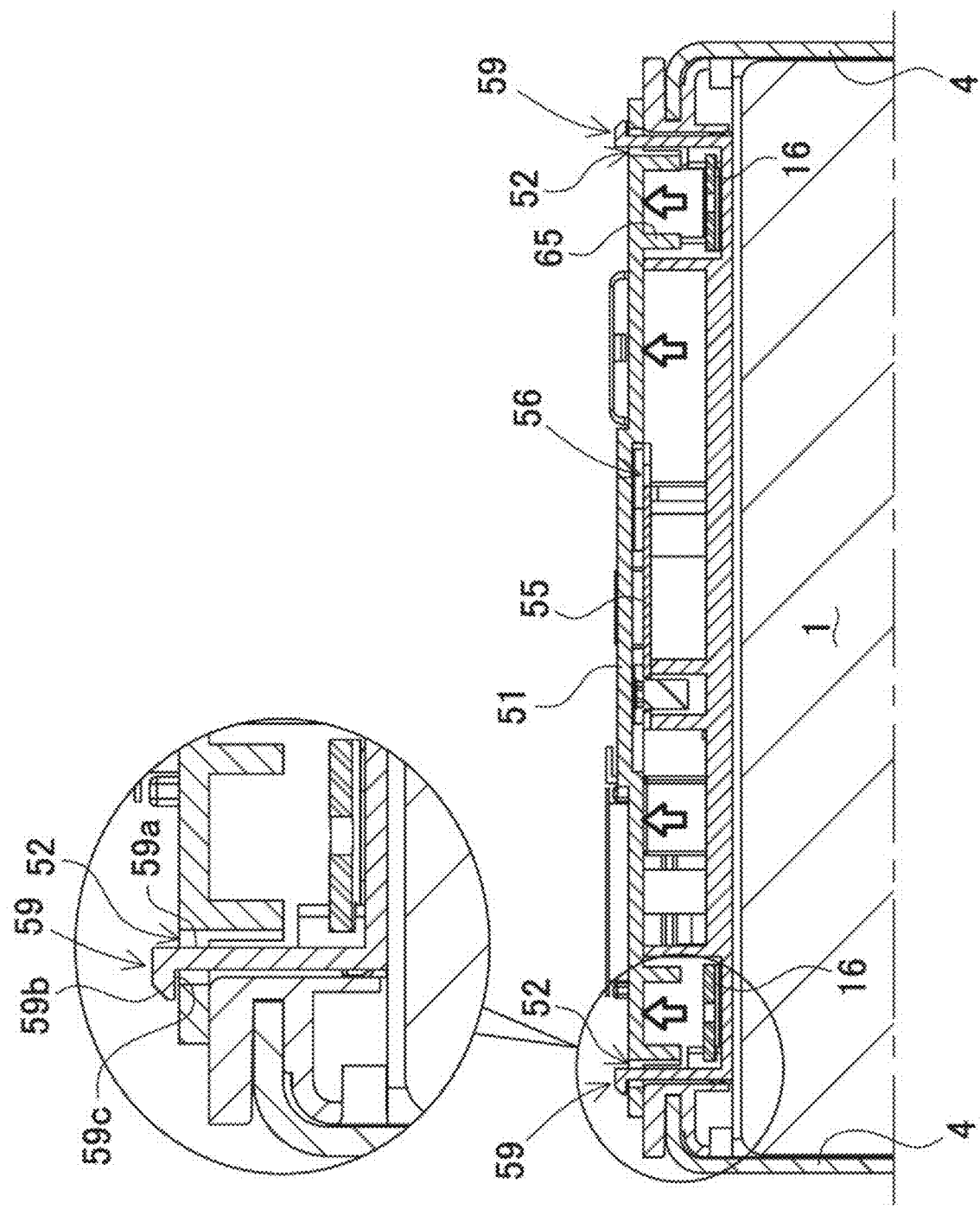
FIG. 10 is an enlarged sectional perspective view of a main part taken along line X-X in FIG. 1.

In contrast, when vertical gas flow bending portion 65 is provided protruding downward from a back surface of an upper case as illustrated in FIGS. 8 and 10 and even when a gap is formed between the upper end of wall portion 58 and the bottom surface of upper cover 51 during gas discharge, vertical gas flow bending portion 65 inhibits high-pressure gas having entered sub-path 62 from main path 61 through the gap from flowing linearly, and then the gas temporarily flows toward a bottom surface of sub-path 62. The gas flow bent toward the bottom surface of sub-path 62 flows toward exhaust port 63, so that a direction of the gas flow needs to be further changed to an upward direction. When vertical gas flow bending portion 65 is provided as described above, the gas flow cannot reach exhaust port 63 unless a direction of fluid is changed at least twice. Then, forced multiple changes of a flow direction of the fluid as described above enable solids and liquids other than gas, such as fragments of gas discharge valve 15 and the contents of the secondary battery cell, to be effectively prevented from flowing out to the outside. In particular, effect of trapping sparks contained in the gas and preventing them from leaking to the outside from the power supply device is also enhanced. When a discharge path of gas is lengthened, decrease in temperature of the gas also can be expected. Additionally, lengthening of gas guide path 60 using vertical gas flow bending portion 65 can be applied to not only when a gap is formed between the upper case and wall portion 58 due to expansion of the upper case, but also when no gap is formed. As described above, when a flow direction of a gas flow is changed in a vertical direction using vertical gas flow bending portion 65 in addition to change in direction of the gas flow to a horizontal direction using horizontal gas flow bending portion 64 described above, gas guide path 60 can be increased in path length, and thus a limited space can be effectively utilized.

(Exhaust Port 63)

As described above, cover part 50 is formed with exhaust port 63 for discharging gas guided from gas discharge valve 15 to gas guide path 60 to the outside of power supply device 100. Exhaust port 63 is formed in a direction intersecting the stacking direction of secondary battery cells 1.

Gas guide path 60 includes end surface walls 66 disposed on opposite end sides of secondary battery cell 1 in the stacking direction. In other words, no gas exhaust port 63 is provided in opposite end surfaces of cover part 50 in its longitudinal direction. The structure formed as describe above prevents a situation in which high-pressure gas guided to main path 61 escapes to its opposite ends side with high pressure maintained. When the structure is formed in cover part 50, safety can be improved by discharging the high-pressure gas to the outside after the high-pressure gas is caused to flow through gas guide path 60 while causing pressure loss and weakening momentum.

Holder part 56 includes bus bar holding part 57 for holding bus bar 16, being disposed in sub-path 62 facing exhaust port 63. In other words, bus bar 16 is configured to be disposed in front of exhaust port 63 in gas guide path 60. This structure allows gas exhausted from gas discharge valve 15 to be brought into contact with bus bar 16 made of metal before being discharged to the outside of power supply device 100 from exhaust port 63, so that heat of the gas is transferred to bus bar 16. This enables decrease in temperature, so that effect of improving safety can be obtained by reducing temperature when the gas is discharged to the outside of the power supply device.

(Locking Hook 59)

Upper cover 51 has opposite ends fixed to holder part 56. Holder part 56 is provided on its opposite ends with respective locking hooks 59. Then, upper cover 51 is formed with locking hole 52 configured to lock locking hook 59. As illustrated in FIG. 2, gas guide path 60 defined by wall portion 58 in the upper surface of holder part 56 opens upward. Upper cover 51 is fixed to the upper surface of holder part 56 using a locking structure, closing the upper surface of holder part 56. Upper cover 51 is configured not to come off even when upper cover 51 swells slightly due to pressure of gas during gas discharge. This state is illustrated in the sectional view of FIG. 10.

Holder part 56 locks upper cover 51 with locking hook 59 to close gas guide path 60 from above using upper cover 51. Locking hook 59 includes a claw portion projecting upward in each of side surface regions on opposite sides of holder part 56, parallel to the stacking direction of secondary battery cells 1. This claw portion is formed in a claw shape, and includes vertical surface 59a formed substantially vertically and inclined surface 59b inclined laterally from an upper portion. Inclined surface 59b is formed widening toward the outside of holder part 56. Additionally, locking surface 59c is horizontally formed extending from a lower end of inclined surface 59b of the claw portion at an acute angle. This claw portion is formed in an L shape bent outward of holder part 56 as illustrated in the sectional view of FIG. 10.

Then, upper cover 51 includes locking hole 52 opened in its side surface corresponding to locking hook 59, into which the claw portion of locking hook 59 is inserted. Locking hook 59 is inserted into locking hole 52, and locking surface 59c of the claw portion is brought into contact with a region located outside upper cover 51 within an open end edge of locking hole 52, and then cover 51 is locked to holder part 56. This structure enables upper cover 51 to be reliably connected to holder part 56, and thus upper cover 51 is configured to be less likely to come off due to pressure of high-pressure gas, especially during gas discharge. When gas is discharged and internal pressure is applied to upper cover 51 to cause upper cover 51 to be deformed swelling upward, this deformation acts in a direction in which locking hook 59 and locking hole 52 are more locked. As a result, upper cover 51 is maintained in a firmly connected state to prevent upper cover 51 from falling off, for example.

(Thermal Fuse 71)

Thermal fuse 71 for detecting gas discharge can be further disposed in gas guide path 60. This enables thermal fuse 71 to be operated using high-pressure gas guided into gas guide path 60 to detect gas discharge.

(Main Path 61)

A state in which gas discharge valve 15 of any of secondary battery cells 1 is opened to discharge gas in power supply device 100 of FIGS. 4A to 7 is considered. Gas exhausted from secondary battery cell 1 is received by main path 61 of gas guide path 60 provided in the upper surface of secondary battery cell 1 as illustrated in the vertical sectional view of FIG. 7. Gas guide path 60 has a top surface composed of main-path cover 55 made of metal, and an upper surface of main-path cover 55 is covered with upper cover 51. Thus, gas guide path 60 can sufficiently withstand gas pressure. Gas discharged vigorously upward from gas discharge valve 15 is received by a large area of main-path cover 55 and loses a considerable amount of pressure. At this time, heat of the gas is also absorbed by main-path cover 55 made of metal and a side surface of the main path, and the gas is reduced in temperature.

Here, main path 61 of gas guide path 60 has a sectional area equal to or larger than an opening area of gas discharge valve 15. This prevents gas discharge from gas discharge valve 15 from being inhibited by residence of gas when the gas discharged from gas discharge valve 15 is guided to main path 61. Although convection of gas may increase internal pressure of main path 61 to increase temperature of the gas discharged from gas discharge valve 15, using this structure enables the temperature rise of the gas to be reduced. Main path 61 has a sectional area that is defined by vertical and horizontal dimensions when main path 61 has a rectangular section.

(Sub-Path 62)

When gas is guided to main path 61 as described above, the gas is dispersed in main path 61 and discharged to sub-path 62. At this time, a bent path formed in main path 61 causes the gas to be meandered so that sparks contained in the gas are not discharged to the outside of the power supply device.

Burning fine particles have a mass, so that the sparks in the gas tries to go straight due to inertia caused by movement of the gas under high pressure during gas discharge. As a result, momentum of the gas is reduced by bending gas guide path 60, and thus heat of the gas is also reduced. As described above, the high-pressure gas contains unburned gas and sparks having already ignited, and the sparks are prevented from being discharged from the power supply device by reducing momentum of the sparks in a path from gas discharge valve to exhaust port 63 of the power supply device using a property of having a larger inertia than the gas, and are also reduced in temperature to improve safety.

Second Exemplary Embodiment

Additionally, an obstacle for reducing momentum of a gas flow may be disposed in the gas guide path. For example, power supply device 200 according to a second exemplary embodiment illustrated in FIG. 11 includes mesh body 68 disposed in main path 61 as an obstacle. A perspective view of mesh body 68 is illustrated in FIG. 12A, a side view thereof is illustrated in FIG. 12B, and a front view thereof is illustrated in FIG. 12C. This mesh body 68 is a continuous metal mesh in which many holes 69 are formed in a metal sheet. The metal sheet is formed having a section in a zigzag shape as illustrated in the side view of FIG. 12B. When mesh body 68 as described above is fixed in main path 61, a situation in which sparks leak from the main path can be avoided by trapping the sparks contained in gas in holes 69 of mesh body 68. Additionally, when high-temperature gas is caused to pass through mesh body 68 made of metal, effect of reducing temperature of the gas by removing heat thereof also can be obtained.

Figure 11:
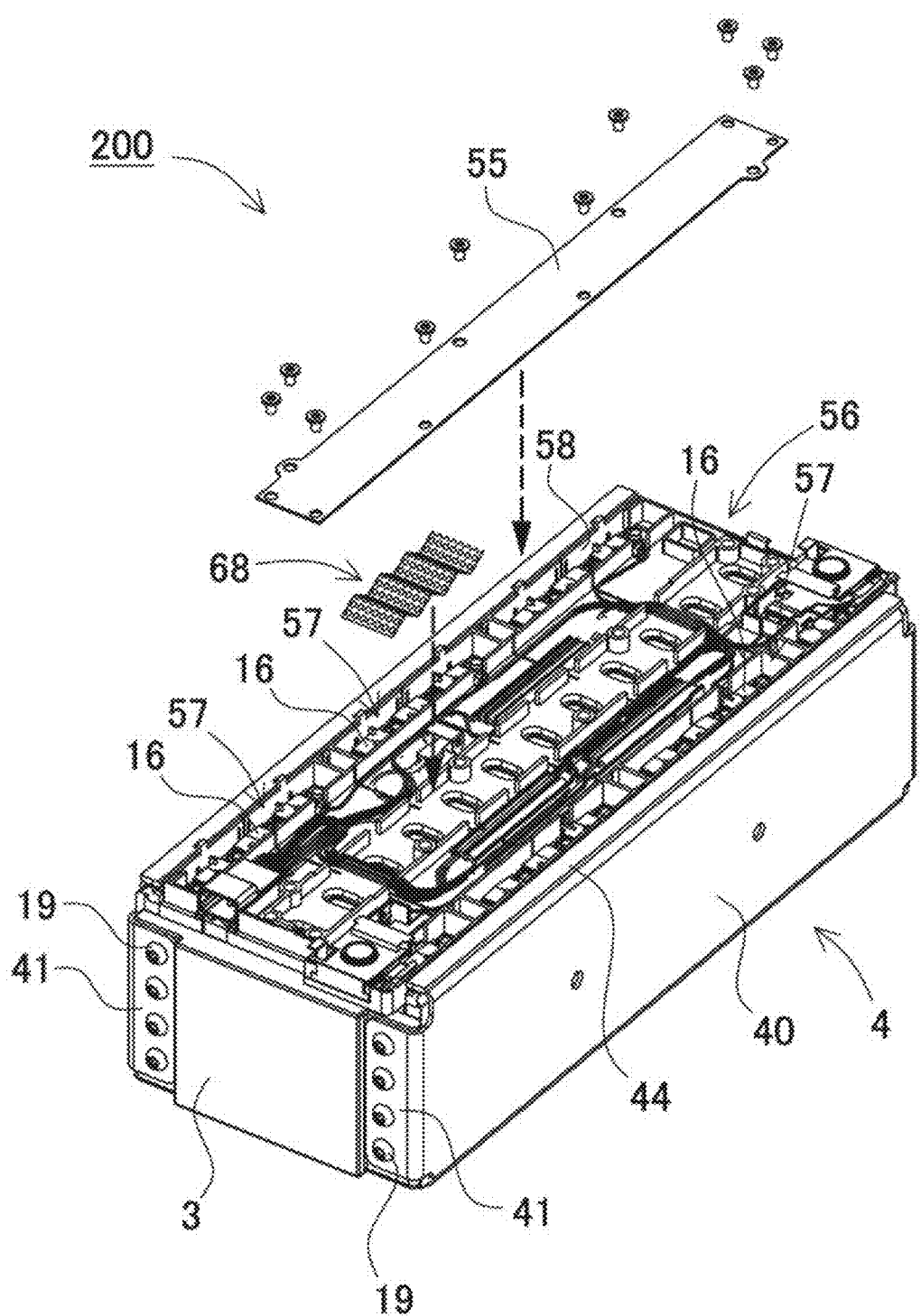
FIG. 11 is an exploded perspective view illustrating a power supply device according to a second exemplary embodiment.
Figure 12A:
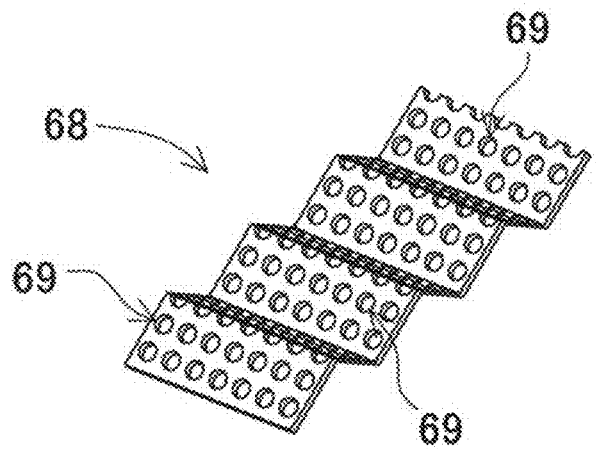
FIG. 12A is a perspective view of a mesh body of FIG. 11.
Figure 12B:
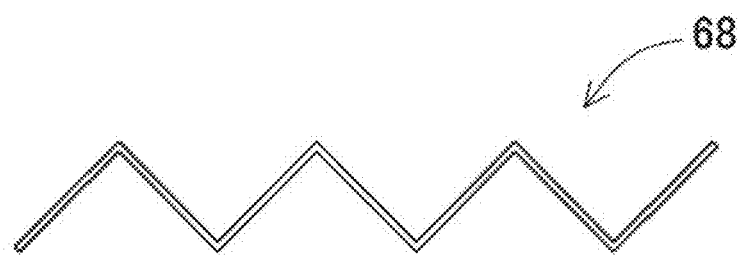
FIG. 12B is a side view thereof.
Figure 12C:
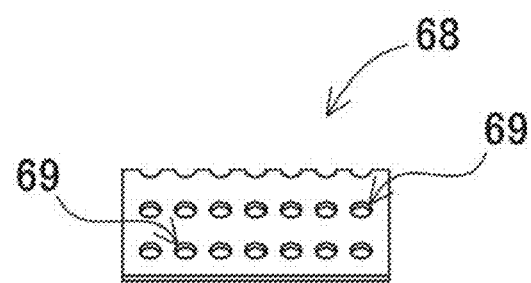
FIG. 12C is a front view thereof.

Although only one mesh body 68 is disposed in a part of main path 61 in the example of FIG. 11, the present invention is not limited to this structure, and a plurality of mesh bodies may be disposed in main path 61. The mesh body may be disposed in sub-path 62. The mesh body is not limited in size to the example illustrated in FIG. 11. For example, a long mesh body obtained by extending one mesh body along an extension direction of the main path or the sub-path may be used.

Interfaces through which gas is guided to sub-path 62 from main path 61 are each formed having an opening area such that a total sum of each opening area is larger than a sectional area of main path 61. This enables preventing an excessive increase in internal pressure due to residence of gas in main path 61. Specifically, horizontal gas flow bending portions 64 formed in main path 61 each have an opening area such that a total sum of each opening area is larger than the sectional area of main path 61. This enables gas discharged to main path 61 to be smoothly discharged, so that a temperature rise of the gas can be reduced. Then, effect of avoiding a situation in which the main path is burst due to expansion of gas staying in the main path without being discharged also can be expected. As illustrated in FIG. 4A, first opening 64a opened in wall portion 58 can also be used as a space for allowing a harness for connecting thermal fuse 71 and the like to pass through the space. In other words, the space through which the harness passes is also used as an opening for forcibly bending a gas flow.

Additionally, effect of reducing gas temperature can be obtained by utilizing the entire space of sub-path 62. Similarly, a path from sub-path 62 to exhaust port 63 for discharging gas to the outside of the power supply device is also bent to prevent sparks from being discharged.

Even when gas at high temperature and under high pressure is discharged from gas discharge valve 15 of any of secondary battery cells 1, the gas guide path formed as described above reduces the pressure and the temperature while the gas flows to reach exhaust port 63 to be discharged outside from the power supply device, and thus safety is improved. In particular, sparks generated by ignition of fine particles contained in gas become an ignition source when they are released to the outside of the power supply device. Thus, preventing sparks from leaking from the power supply device is especially important to ensure safety. Then, the present exemplary embodiment improves safety by devising an internal structure of gas guide path such that sparks are prevented from being emitted to the outside by reducing momentum of the sparks to allow them to remain in gas guide path 60, or are reduced in pressure or temperature and discharged.

The above power supply device can be used as a vehicle-mounted power source. As a vehicle equipped with the power supply device, an electric vehicle such as a hybrid vehicle or a plug-in hybrid vehicle that travels using both an engine and a motor, and an electric vehicle that travels using only a motor can be used, and the power supply device is used as a power source for these vehicles. As an example, power supply device 1000 with high capacity and high output configured by connecting a large number of the above-described power supply devices in series or in parallel to obtain electric power for driving a vehicle, and by further adding a necessary controlling circuit, will be described.

(Power Supply Device for Hybrid Vehicles)

Figure 13:
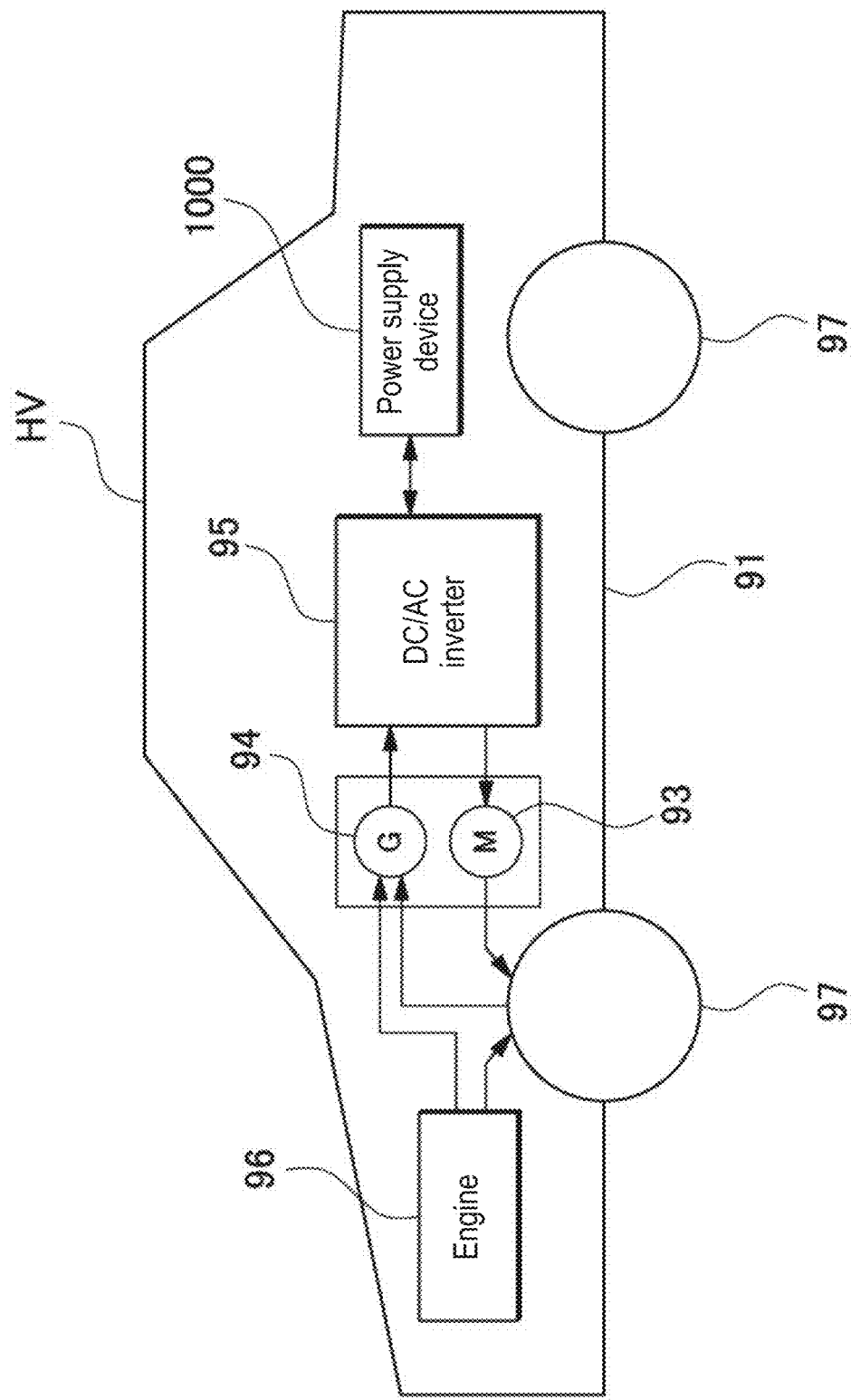
FIG. 13 is a block diagram illustrating an example in which a power supply device is mounted on a hybrid vehicle traveling using an engine and a motor.

FIG. 13 shows an example in which a power supply device is mounted on a hybrid vehicle traveling using both an engine and a motor. Vehicle HV equipped with the power supply device illustrated in the drawing includes vehicle body 91, engine 96 for causing vehicle body 91 to travel, motor 93 for traveling, wheels 97 that are driven using engine 96 and motor 93 for traveling, power supply device 1000 that supplies electric power to motor 93, and generator 94 that charges a battery of power supply device 1000. Power supply device 1000 is connected to motor 93 and generator 94 via DC/AC inverter 95. Vehicle HV travels using both motor 93 and engine 96 while charging and discharging the battery of power supply device 1000. Motor 93 is driven to cause the vehicle to travel in a region having a low engine efficiency, such as during accelerating or traveling at a low speed. Motor 93 is driven by electric power supplied from power supply device 1000. Generator 94 is driven using engine 96, or regenerative braking when the vehicle is braked, to charge the battery of power supply device 1000.

(Power Supply Device for Electric Vehicles)

Figure 14:
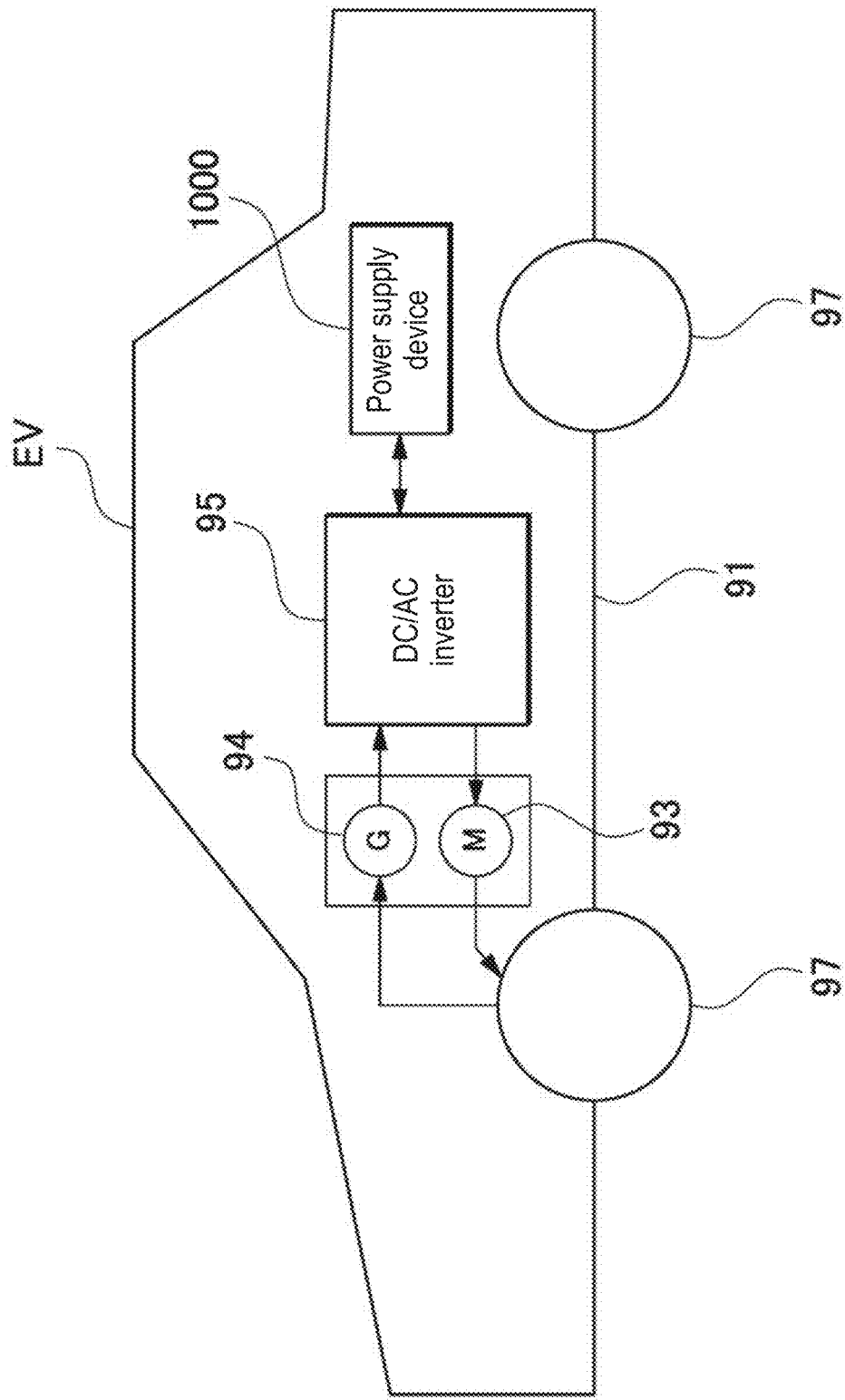
FIG. 14 is a block diagram illustrating an example in which a power supply device is mounted on an electric vehicle traveling using only a motor.

FIG. 14 illustrates an example in which a power supply device is mounted on an electric vehicle traveling using only a motor. Vehicle EV equipped with the power supply device illustrated in the drawing includes vehicle body 91, motor 93 for traveling that causes vehicle body 91 to travel, wheels 97 that are driven using this motor 93, power supply device 1000 that supplies electric power to this motor 93, and generator 94 that charges a battery of this power supply device 1000. Power supply device 100 is connected to motor 93 and generator 94 via DC/AC inverter 95. Motor 93 is driven by electric power supplied from power supply device 1000. Generator 94 is driven by energy when vehicle EV is regeneratively braked, and charges the battery of power supply device 1000.

(Power Storage System)

Figure 15:
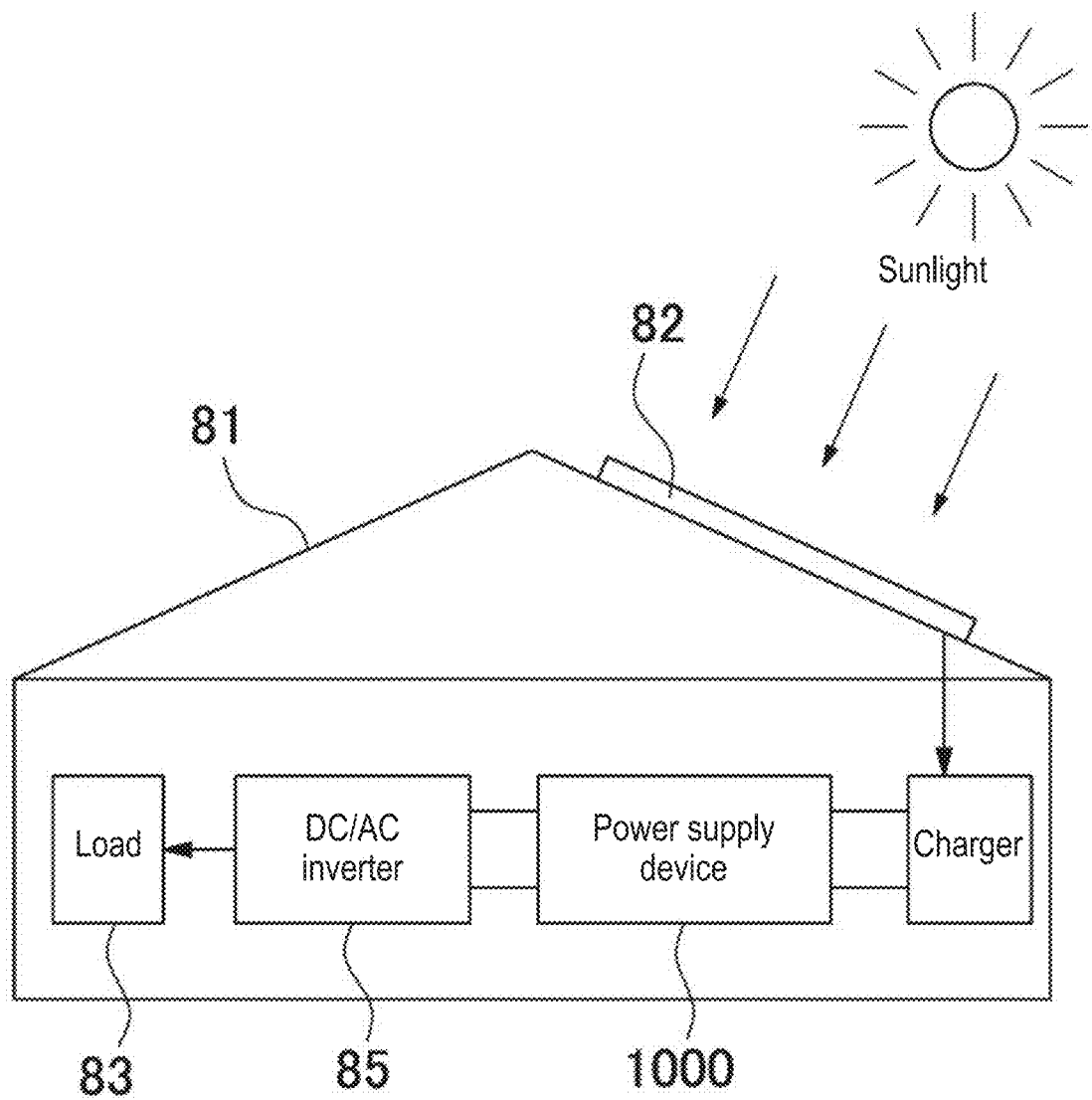
FIG. 15 is a block diagram illustrating an example applied to a power supply device for power storage.

The present invention does not specify a use of the power supply device as a power source of a motor that causes a vehicle to travel. The power supply device according to the exemplary embodiment can also be used as a power source of a power storage system that charges a battery with electric power generated by solar power generation, wind power generation, or the like, and stores electricity. FIG. 15 illustrates a power storage system in which a battery of power supply device 1000 is charged using a solar battery to store electricity. As illustrated in the drawing, the power storage system illustrated in the drawing charges the battery of power supply device 100 with electric power generated by solar battery 82 disposed on a roof or a rooftop of building 81 such as a house or a factory. This power storage system further supplies power stored in power supply device 100 to load 83 via DC/AC inverter 85.

Although not illustrated, the power supply device can also be used as a power source of a power storage system that charges a battery and stores electricity by using midnight power at night. The power supply device charged with the midnight power enables limiting peak power during a daytime to a small value by charging using the midnight power that is surplus power of a power plant, and outputting power during the daytime in which power load increases. The power supply device can also be used as a power source that is charged using both output of a solar battery and the midnight power. This power supply device can efficiently store electricity by effectively using both electric power generated by a solar battery and the midnight power in consideration of weather and power consumption.

The power storage system as described above can be suitably used for applications such as a backup power supply device that can be installed in a rack of a computer server, a backup power supply device for a wireless base station for a cellular phone or the like, a power source for storing electricity for a home or a factory, a power source of a street light, a power storage device combined with a solar battery, and a backup power source for a traffic light and a traffic indicator for a road.

INDUSTRIAL APPLICABILITY

The power supply device according to the present invention and a vehicle equipped with the power supply device can be suitably used as a power source for a large current used for a power source of a motor for driving an electric vehicle such as a hybrid vehicle, a fuel cell vehicle, an electric vehicle, or an electric motorcycle. Examples of the power supply device includes a power supply device for a plug-in hybrid electric vehicle that can be switched between an EV traveling mode and an HEV traveling mode, a power supply device for a hybrid electric vehicle, a power supply device for an electric vehicle, and the like. The power supply device also can be suitably used for applications such as a backup power supply device that can be installed in a rack of a computer server, a backup power supply device for a wireless base station for a cellular phone or the like, a power source for storing electricity for a home or a factory, a power source or the like of a street light, a power storage device combined with a solar battery, and a backup power source for a traffic light or the like.

REFERENCE MARKS IN THE DRAWINGS

1: secondary battery cell
1a: exterior can
1b: sealing plate
2: battery stack
3: end plate
4: fastening member
terminal surface
11: electrode terminal
12: separator
13: end surface spacer
15: gas discharge valve
16: bus bar
19: fastener
36: first through-hole
40: body portion
41: fixing portion
42: through-hole
44: bent portion
50: cover part
51: upper cover
52: locking hole
55: main-path cover
56: holder part
57: bus bar holding part
58: wall portion
58A: first wall portion
58B: second wall portion
59: locking hook
59a: vertical surface
59b: inclined surface
59c: locking surface
60: gas guide path
61: main path
62A: first sub-path
62B: second sub-path
62: sub-path
63: exhaust port
64: horizontal gas flow bending portion
64a: first opening
64b: second opening
65: vertical gas flow bending portion
66: end surface wall
68: mesh body
69: hole
71: thermal fuse
81: building
82: solar battery
83: load
85: DC/AC inverter
91: vehicle body
93: motor
94: generator
95: DC/AC inverter
96: engine
97: wheel
100, 200, 1000: power supply device
HV: vehicle
EV: vehicle

The invention claimed is:

1. A power supply device comprising:
a plurality of secondary battery cells each having a gas discharge valve for discharging internal gas; and
a cover part disposed on one surface of a battery stack including the plurality of secondary battery cells stacked, and covering the gas discharge valve of each of the plurality of secondary battery cells,
the cover part including with a gas guide path partitioned to discharge gas discharged from the gas discharge valve to an outside of the cover part, and
the gas guide path including one or more horizontal gas flow bending portions that bend a flow direction of at least part of the gas in plan view of the cover part, wherein
the gas guide path further includes a vertical gas flow bending portion that bends a flow direction of at least part of the gas in longitudinal sectional view of the cover part,
the gas guide path further includes a main path being linear and facing the gas discharge valve of each of the plurality of secondary battery cells, and at least one first sub-path disposed adjacent to the main path,
the main path and the at least one first sub-path are connected via the one or more horizontal gas flow bending portions, and
each of the one or more horizontal gas flow bending portions is an opening formed in a wall surface defining the main path.

2. The power supply device according to claim 1, wherein the one or more horizontal gas flow bending portions formed in the main path have a total sum of opening areas that is larger than a sectional area of the main path.

3. The power supply device according to claim 1, wherein the gas guide path further includes at least one second sub-path disposed adjacent to the at least one first sub-path, and
the at least one first sub-path and the at least one second sub-path are connected via the vertical gas flow bending portion.

4. The power supply device according to claim 3, wherein the vertical gas flow bending portion is an opening formed in a wall surface defining the at least one first sub-path, and has a total sum of opening areas that is larger than a sectional area of the at least one first sub-path.

5. The power supply device according to claim 3, further comprising a main-path cover containing metal covering the main path from above.

6. The power supply device according to claim 5, wherein the cover part includes an upper cover covering the gas guide path including an upper surface of the main-path cover from above.

7. The power supply device according to claim 6, wherein the vertical gas flow bending portion is formed on a bottom surface side of the upper cover, and
a gap is formed between an end edge of the vertical gas flow bending portion and a floor surface of the gas guide path.

8. The power supply device according to claim 6, further comprising bus bars containing metal for connecting electrode terminals of the plurality of secondary battery cells,
wherein the cover part includes a holder part for holding the bus bars, and
the holder part includes a wall portion erected partitioning the gas guide path.

9. The power supply device according to claim 8, wherein the holder part includes a locking hook for locking the upper cover, the gas guide path defined by the wall portion in an upper surface of the holder part opens upward, and the upper cover is locked with the locking hook to close the gas guide path with the upper cover from above, the locking hook includes a claw portion projecting upward in a claw shape in each of side surface regions on both sides of the holder part, parallel to a stacked direction of the secondary battery cells, the claw portion having an inclined surface formed outward of the holder part while spreading out, and a locking surface formed extending from the inclined surface of the claw portion at an acute angle, the upper cover includes a locking hole opened on a surface side corresponding to the locking hook to allow the claw portion of the locking hook to be inserted into the locking hole, and the upper cover is locked with the holder part by inserting the locking hook into the locking hole and bringing the locking surface of the claw portion into contact with a region positioned within an opening end edge of the locking hole and outside the upper cover.

10. The power supply device according to claim 1, wherein the one or more horizontal gas flow bending portions are configured to reverse a flow direction of at least part of the gas.

11. The power supply device according to claim 1, wherein the gas guide path has end surface walls disposed at opposite ends in the stacked direction of the secondary battery cells.

12. The power supply device according to claim 11, wherein
the cover part constitutes an exhaust port for discharging the gas guided from the gas discharge valve to the gas guide path to the outside of the power supply device,
the battery stack has the plurality of secondary battery cells stacked, and
the exhaust port is formed in a direction intersecting a stacking direction of the secondary battery cells.

13. The power supply device according to claim 12, wherein bus bars containing metal and configured to connect electrode terminals of the plurality of secondary battery cells are disposed inside the gas guide path and in front of the exhaust port.

14. The power supply device according to claim 1, further comprising a thermal fuse disposed inside the gas guide path to detect gas discharge.

15. A vehicle comprising:
the power supply device according to claim 1;
a motor for traveling supplied with electric power from the power supply device;
a vehicle body mounted with the power supply device and the motor; and
wheels driven by the motor to allow the vehicle body to travel.

16. A power supply device comprising:
a plurality of secondary battery cells each having a gas discharge valve for discharging internal gas; and
a cover part disposed on one surface of a battery stack including the plurality of secondary battery cells stacked, and covering the gas discharge valve of each of the plurality of secondary battery cells,
the cover part including with a gas guide path partitioned to discharge gas discharged from the gas discharge valve to an outside of the cover part, and the gas guide path including one or more horizontal gas flow bending portions that bend a flow direction of at least part of the gas in plan view of the cover part, wherein the gas guide path has end surface walls disposed at opposite ends in the stacked direction of the secondary battery cells,
the cover part constitutes an exhaust port for discharging the gas guided from the gas discharge valve to the gas guide path to the outside of the power supply device,
the battery stack has the plurality of secondary battery cells stacked,
the exhaust port is formed in a direction intersecting a stacking direction of the secondary battery cells, and
bus bars containing metal and configured to connect electrode terminals of the plurality of secondary battery cells are disposed inside the gas guide path and in front of the exhaust port.

17. The power supply device according to claim 16, wherein the gas guide path further includes a vertical gas flow bending portion that bends a flow direction of at least part of the gas in longitudinal sectional view of the cover part.

18. The power supply device according to claim 17, wherein
the gas guide path further includes a main path being linear and facing the gas discharge valve of each of the plurality of secondary battery cells, and at least one first sub-path disposed adjacent to the main path, and
the main path and the at least one first sub-path are connected via the one or more horizontal gas flow bending portions.

19. The power supply device according to claim 16, wherein the one or more horizontal gas flow bending portions are configured to reverse a flow direction of at least part of the gas.

20. The power supply device according to claim 16, further comprising a thermal fuse disposed inside the gas guide path to detect gas discharge.

21. A vehicle comprising:
the power supply device according to claim 16;
a motor for traveling supplied with electric power from the power supply device;
a vehicle body mounted with the power supply device and the motor; and
wheels driven by the motor to allow the vehicle body to travel.

* * * * *